(12) United States Patent
Waughtal et al.

(10) Patent No.: US 12,254,487 B2
(45) Date of Patent: Mar. 18, 2025

(54) DUAL NETWORK IMPLEMENTED METHOD OF A CUSTOMER RELATIONSHIP MANAGEMENT AND POINT OF SALE MERCHANDISING SYSTEM FOR PATRON EXPERIENCE

(71) Applicant: FCS Processing, LLC., Austin, TX (US)

(72) Inventors: Jeff Waughtal, Austin, TX (US); David Avery, Austin, TX (US)

(73) Assignee: FCS Processing, LLC, Austin, TX (US)

( * ) Notice: Subject to any disclaimer, the term of this patent is extended or adjusted under 35 U.S.C. 154(b) by 0 days.

(21) Appl. No.: 18/139,201

(22) Filed: Apr. 25, 2023

(65) Prior Publication Data

US 2024/0362670 A1    Oct. 31, 2024

(51) Int. Cl.
  *G06Q 30/00*       (2023.01)
  *G06Q 20/32*       (2012.01)
  *G06Q 30/0207*     (2023.01)
  *G06Q 30/0238*     (2023.01)

(52) U.S. Cl.
  CPC ......... *G06Q 30/0238* (2013.01); *G06Q 20/32* (2013.01); *G06Q 30/0236* (2013.01)

(58) Field of Classification Search
  None
  See application file for complete search history.

(56) References Cited

U.S. PATENT DOCUMENTS

| | | | |
|---|---|---|---|
| 5,255,182 | A | 10/1993 | Adams |
| 5,532,466 | A | 7/1996 | Konno et al. |
| 6,254,004 | B1 | 7/2001 | Nagao et al. |
| 6,763,336 | B1 | 7/2004 | Kolls |
| 7,349,871 | B2 | 3/2008 | Labrou et al. |
| 7,364,070 | B2 | 4/2008 | Chang |
| 7,774,402 | B2 | 8/2010 | Singh et al. |
| 7,801,826 | B2 | 9/2010 | Labrou et al. |
| 7,941,542 | B2 | 5/2011 | Broda et al. |

(Continued)

FOREIGN PATENT DOCUMENTS

| | | |
|---|---|---|
| CA | 2001084779 A1 | 8/2001 |
| CN | 109215255 A | 1/2019 |

*Primary Examiner* — Christopher Stroud
(74) *Attorney, Agent, or Firm* — Bryan L. Baysinger; Eric Mills; Maynard Nexsen PC

(57) ABSTRACT

Aspects of a method for implementing a customer relationship management (CRM) and point of sale (POS) system on a node-to-node network for patron experience are disclosed including capturing transaction data or generating transaction data from one or more POS devices of a plurality of POS devices establishing a node-to-node network for processing payment on a commercial transaction are provided. Aspects of the method also include aggregating a data set associated with the commercial transaction. Moreover, aspects of the method also include reconciling the aggregated data set with a distributed ledger operating on the node-to-node network. Aspects of a CRM and POS system for patron experience are also provided, wherein the system comprises a remote payment device associated with information for making payment on a commercial transaction; and a plurality of POS devices establishing a node-to-node network for processing payment on the commercial transaction.

8 Claims, 12 Drawing Sheets

(56) References Cited

U.S. PATENT DOCUMENTS

| | | |
|---|---|---|
| 8,548,859 B2 | 10/2013 | Maltkovic |
| 8,561,884 B2 | 10/2013 | Jimenez Alamo |
| 8,768,838 B1 | 7/2014 | Hoffman |
| 9,558,503 B2 | 1/2017 | Oh et al. |
| 10,607,203 B2 | 3/2020 | Goldberg |
| 10,854,049 B2 | 12/2020 | Waughtal |
| 10,896,425 B2 | 1/2021 | Waughtal |
| 10,990,980 B1 | 4/2021 | Reses et al. |
| 11,361,322 B2 | 6/2022 | Waughtal |
| 2002/0152124 A1 | 10/2002 | Guzman et al. |
| 2004/0128256 A1 | 7/2004 | Krouse et al. |
| 2005/0086286 A1 | 4/2005 | Gatto et al. |
| 2005/0086360 A1 | 4/2005 | Mamou et al. |
| 2007/0188749 A1 | 8/2007 | Brady et al. |
| 2007/0233603 A1 | 10/2007 | Schmidgall et al. |
| 2008/0051059 A1 | 2/2008 | Fisher |
| 2008/0059306 A1* | 3/2008 | Fordyce .......... G06Q 30/0238 705/14.27 |
| 2008/0147495 A1 | 6/2008 | Bal et al. |
| 2008/0220871 A1* | 9/2008 | Asher ............. G06Q 30/0212 463/42 |
| 2008/0270301 A1 | 10/2008 | Jones et al. |
| 2009/0032586 A1* | 2/2009 | Hunt .................. G09F 23/00 235/382 |
| 2009/0157519 A1* | 6/2009 | Bishop ............... G06Q 20/20 705/19 |
| 2010/0051689 A1 | 3/2010 | Diamond |
| 2010/0052916 A1* | 3/2010 | Canora ............... G09F 3/005 340/573.1 |
| 2011/0276636 A1 | 11/2011 | Cheng et al. |
| 2012/0316963 A1* | 12/2012 | Moshfeghi ......... G06Q 20/20 705/14.58 |
| 2013/0253999 A1* | 9/2013 | Pinkus .............. G06Q 30/02 705/14.62 |
| 2013/0263008 A1 | 10/2013 | Bylahali et al. |
| 2013/0317928 A1 | 11/2013 | Laracey |
| 2015/0120666 A1 | 4/2015 | Otsuka |
| 2016/0086161 A1 | 3/2016 | Zhou et al. |
| 2016/0321661 A1 | 11/2016 | Hammond et al. |
| 2017/0337550 A1* | 11/2017 | Aparicio Ruiz ... G06Q 20/3829 |
| 2018/0276666 A1* | 9/2018 | Haldenby ........... H04L 9/3268 |
| 2020/0005267 A1* | 1/2020 | Siefken ............. G06Q 20/209 |
| 2020/0074437 A1* | 3/2020 | Bonsi ............... G06Q 20/326 |
| 2020/0160307 A1* | 5/2020 | Vick ................. G06Q 20/325 |
| 2020/0242616 A1* | 7/2020 | Waughtal .......... G06Q 20/3278 |
| 2020/0242899 A1* | 7/2020 | Waughtal ............ G06F 1/1656 |
| 2021/0174361 A1* | 6/2021 | Potireddy ......... G06Q 20/4016 |
| 2022/0101375 A1* | 3/2022 | Moreno ............ G06Q 30/0254 |

* cited by examiner

DUAL NETWORK IMPLEMENTED METHOD OF A CUSTOMER RELATIONSHIP MANAGEMENT AND POINT OF SALE MERCHANDISING SYSTEM FOR PATRON EXPERIENCE

CROSS-REFERENCE TO RELATED APPLICATIONS

The present application is being co-filed with U.S. application Ser. No. 18/139,102, titled Edge Network Monitoring and Adaptation Systems; U.S. application Ser. No. 18/139,153, titled A Unified Controller System for Point-of-Sale Devices; and U.S. application Ser. No. 18/139,185, titled Dual Network Synchronization Across Point-of-Sale Devices Located at an Event Environment, the contents of which are incorporated by reference herein in their entirety.

FIELD

This disclosure relates to methods of implementing a customer relationship management (CRM) and point of sale (POS) merchandising system, particularly, methods of providing an improved patron experience for events or functions wherein a CRM and POS are to be used.

BACKGROUND

CRM and POS merchandising systems are complex software solutions that are utilized by users to manage their sales processes and customer interactions. CRM systems are typically built on a centralized database that stores customer data, including contact information, purchase history, and preferences. POS systems, on the other hand, are used for processing sales transactions, managing inventory, and generating sales reports. The integration of CRM and POS systems provides businesses users, for example, with a comprehensive solution for streamlining their operations and enhancing customer experiences.

The physical architecture for CRM and POS systems typically includes software, processing hardware, and networking components. CRM and POS software usually is remote (e.g., cloud-based) or locally installed on servers or terminals. CRM and POS macro hardware typically includes computers, tablets, mobile devices, barcode scanners, radio frequency identification (RFID) readers and sensors, near field communications (NFC) readers and sensors, chip-card readers, swipe-card readers, receipt printers, cash registers, and other peripherals such as cash-loading stations. Moreover, CRM and POS network equipment typically includes routers, switches, and cellular services to enable data synchronization and communication between the CRM and POS system components and outside systems (e.g., financial-institution/credit card networks, bank networks, and clearinghouses).

Implementing CRM and POS systems at events and functions like music festivals, business conventions, arts fairs, farmers' markets, etc., can present unique challenges due to their dynamic nature. Festivals and conventions, for example, are characterized by high volumes of customers, varying sales channels (e.g., food vendors, merchandise booths, credit/voucher or cash exchange, promotion tents and displays, service sales), and limited infrastructure for technology deployment. These factors can pose difficulties in setting up and maintaining CRM and POS systems.

Patron experience programs (or patron incentive programs) are increasingly popular in various industries, including the event and function portion of the entertainment industry, where the satisfaction of patron attendees is critical to the success of the event or function and of those in the future. Patron experience programs are typically designed to enhance the overall experience for the attendee, providing them with unique and memorable moments that foster loyalty and increase satisfaction. Patron experience programs, however, usually rely on the personal computing device, e.g., mobile phone, virtual reality (VR) glass, or wearable, to bring attention to the benefits of the program to the user, which is the ultimate goal of any marketing program under a CRM umbrella.

Consequently, implementing patron experience programs at festivals, large scale events, or conventions comes with its own set of challenges. The dynamic and often chaotic nature of these events, along with varying vendor types, can present difficulties in ensuring seamless and consistent execution of these programs. Factors such as crowd management, logistics, network unreliability, inattentive patrons, and complex coordination with multiple vendors and partners can pose significant obstacles to the successful execution of these programs.

It is, therefore, desirable to overcome the deficiencies of, and provide for improvements to, the state of the art. Thus, there is a need in the art for methods of implementing a CRM and POS merchandising system for improved patron experience

SUMMARY

According to its major aspects and briefly recited, herein is disclosed a method for implementing a CRM and POS system on a node-to-node network for patron experience, the method including: (i) capturing transaction data or generating transaction data from one or more POS devices of a plurality of POS devices establishing a node-to-node network for processing payment on a commercial transaction; (ii) aggregating a data set associated with the commercial transaction; and (iii) reconciling the aggregated data set with a distributed ledger operating on the node-to-node network.

In some aspects, the techniques described herein relate to a method, further including providing the plurality of POS devices.

In some aspects, the techniques described herein relate to a method, further including providing one or more payment vehicle(s).

In some aspects, the techniques described herein relate to a method, further including associating information for making payment on the commercial transaction with the one or more payment vehicle(s).

In some aspects, the techniques described herein relate to a method, wherein associating the information further includes associating customer token ID information with the one or more payment vehicle(s).

In some aspects, the techniques described herein relate to a method, further including obtaining the customer token ID information from a credit vault intermediary institution.

In some aspects, the techniques described herein relate to a method, further including invoking an incentive credit based on the customer token ID information.

In some aspects, the techniques described herein relate to a method, further including loading the aggregated data set into a data lake.

In some aspects, the techniques described herein relate to a method, further including synchronizing the plurality of POS devices with the aggregated data set.

In some aspects, the techniques described herein relate to a method, further including invoking an incentive credit based on network device address information and network timestamp information.

In some aspects, the techniques described herein relate to a method, further including invoking an incentive credit based on globally unique identifier (GUID) information.

In some aspects, the techniques described herein relate to a CRM and POS system for patron experience, including: a payment vehicle associated with information for making payment on a commercial transaction; and a plurality of POS devices establishing a node-to-node network for processing payment on the commercial transaction, wherein each POS device of the plurality of POS devices includes a memory for storing program instructions and a processor configured to execute the program instructions, and wherein, upon executing the program instructions, the processor is configured to: (i) capture transaction data or generate transaction data from one or more POS devices of the plurality of POS devices; (ii) aggregate a data set associated with the commercial transaction; and (iii) reconcile the aggregated data set with a distributed ledger operating on the node-to-node network.

In some aspects, the techniques described herein relate to a system, wherein the processor is further configured to determine customer token ID information associated with the payment vehicle.

In some aspects, the techniques described herein relate to a system, wherein the processor is further configured to obtain the customer token ID information from a credit vault intermediary institution.

In some aspects, the techniques described herein relate to a system, wherein the processor is further configured to invoke an incentive credit based on the customer token ID information.

In some aspects, the techniques described herein relate to a system, wherein the processor is further configured to load the aggregated data set into a data lake.

In some aspects, the techniques described herein relate to a system, wherein the processor is further configured to synchronize the plurality of POS devices with the aggregated data set.

In some aspects, the techniques described herein relate to a system, further including invoking an incentive credit based on network device address information and network timestamp information.

In some aspects, the techniques described herein relate to a system, further including invoking an incentive credit based on GUID information.

These and other advantages will be apparent to those skilled in the art based on the following disclosure.

BRIEF DESCRIPTION OF THE DRAWINGS

Many aspects of the present disclosure will be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. It should be recognized that these implementations and embodiments are merely illustrative of the principles of the present disclosure. Therefore, in the drawings.

DETAILED DESCRIPTION

Figure 1:
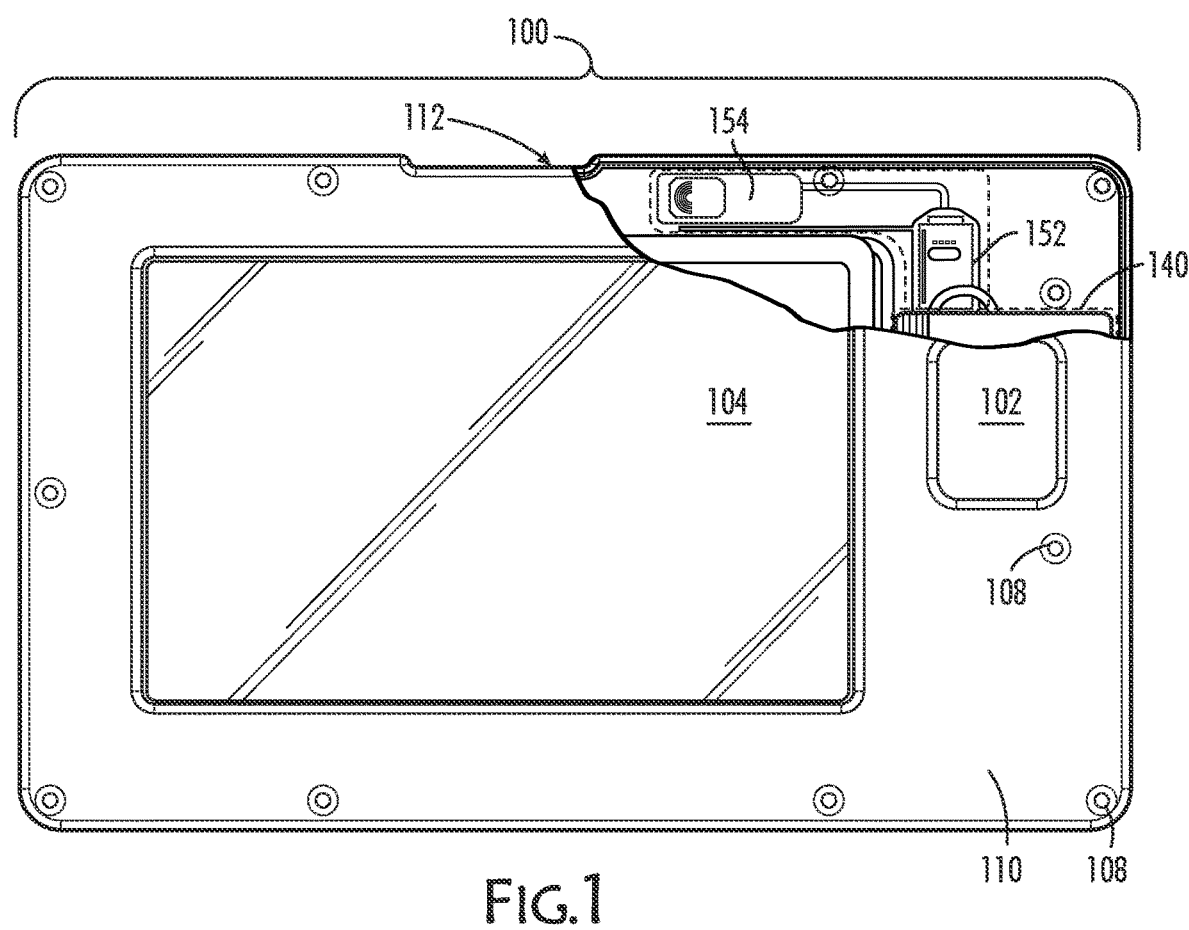
FIG. 1 is a front perspective view illustration of an example point-of-sale device as disclosed herein.

The presently disclosed subject matter now will be described more fully hereinafter with reference to the accompanying drawings, if any, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Throughout this specification and the claims, the terms "comprise," "comprises," and "comprising" are used in a non-exclusive sense, except where the context requires otherwise. Likewise, the term "includes" and its grammatical variants are intended to be non-limiting, such that recitation of items in a list is not to the exclusion of other like items that can be substituted or added to the listed items.

Moreover, many modifications and other embodiments of the presently disclosed subject matter can be described in the general context of computer code or machine-useable instructions, including computer-executable instructions such as program modules, being executed by a computer or other machine (virtual or otherwise), such as a smartphone or other handheld device. Generally, program modules, or engines, including routines, programs, objects, components, data structures etc., refer to code that perform particular tasks or implement particular abstract data types. Embodiments of the invention can be practiced in a variety of system configurations, including hand-held devices and tablets, consumer electronics, general-purpose computers, more specialized computing devices, etc. Embodiments of the invention can also be practiced in distributed computing environments where tasks are performed by remote processing devices that are linked through a communications network.

One of the challenges in implementing CRM and POS systems in an event or function is the requirement for reliable and robust internet connectivity. CRM and POS systems often rely on real-time data synchronization and communication with a central database, which necessitates stable and fast internet connectivity. However, festivals and conventions, for example, typically are held in remote locations or temporary venues where internet connectivity is unreliable or limited, resulting in potential errors or delays in data synchronization and transaction processing.

Another challenge in implementing CRM and POS systems in an event or function is the complexity of managing multiple sales channels at the event or function and integrating them with a unified CRM and POS system(s). Festivals and conventions, for example, typically include diverse sales channels, such as ticket sales, food and beverage vendors, merchandise booths, cash-loading or credit-loading stations (e.g., for loading value onto NFC accounts or RFID bands), and other on-site services. Integrating these different sales channels or vendors at an event or function with a unified CRM and POS system(s) (or with disparate POS systems that can reconcile and talk between one another, for example) requires careful coordination, data mapping, physical logistics (and customization to ensure seamless data flow, synchronization, and transaction processing. Additionally, managing inventory and sales reports across multiple sales channels or vendors can be difficult, requiring accurate tracking, audit, and reporting to prevent discrepancies or inventory shortages.

The hardware and network requirements for implementing CRM and POS systems (and also patron experience programs or patron incentive programs, as discussed herein) also present a considerable challenge. Festivals or conventions may require that vendors use mobile devices, such as tablets, smartphones, RFID bands, NFC chips, etc., for processing sales transactions. These devices, therefore, need to be equipped with the necessary hardware, such as barcode scanners, receipt printers, broadcast or read sensors, and connected to a reliable network infrastructure with a local server, for example, to ensure smooth and efficient transaction processing. Furthermore, the network architecture may need to be flexible and scalable to accommodate the changing needs of the event or function, such as accommodating temporary network setups or addressing potential network congestion issues.

Additionally, ensuring data security and privacy can be a significant concern when implementing CRM and POS systems. These systems often handle sensitive customer data, including personal information and bank account details, which need to be protected against unauthorized access or data breaches. Implementing robust security measures, such as encryption, authentication, and access controls, is crucial to safeguarding customer data and maintaining compliance with relevant data protection regulations.

Training and support for staff can also be challenging for CRM and POS systems. Festivals and conventions, for example, often rely on temporary or seasonal staff who may have limited familiarity with the CRM and POS systems being used. Training staff on the functionalities and operation of CRM and POS systems within a short timeframe can be challenging, and inadequate training may result in errors, delays, or inconsistencies.

Turning to patron experience programs and the like (e.g., promotional value, promotional credit, promotional exchange, frequent patron, preferred patron, premium or upgraded patron, or incentive and promotion programs), a challenge with implementing a patron experience program at an event or function is the management of large crowds. These events can attract thousands or even tens of thousands of attendees, making it challenging to provide a consistent, continuous, effective, and efficient, yet personalized, transaction experience to each individual. Long lines, overcrowded areas, network issues, purposeful network jamming, and limited resources can all impact the effectiveness of the program, as patrons may become frustrated or dissatisfied with transactions that fail, take too long, or require long lines.

Another challenge is the coordination with various vendors and partners involved in the festival or convention. Patrons may interact with different vendors or sponsors during the event, and ensuring consistent service levels and experiences across all interactions can be complex. Additionally, securing buy-in and cooperation from multiple stakeholders, each with their own priorities, agendas, and incentives/promotions programs can be time-consuming and require careful negotiation and coordination. Moreover, patrons may interact with many different vendors in a short amount of time during intermittent network issues, for example, and processing, reconciling, and clearing transactions without delay is both important and difficult to accomplish.

Logistics plays a critical role in the implementation of a patron experience program at a festival or convention. Coordinating activities, supplies, and personnel across a large venue or multiple locations can be logistically challenging. Ensuring that all elements of the program are in place, from staffing to supplies to equipment, requires meticulous planning and execution.

Furthermore, the time-limited nature of festivals and conventions adds another layer of complexity to implementing a patron experience program. These events typically last for a few days, or even just a few hours, which means that the program must be executed efficiently and effectively within the limited timeframe. This can put pressure on the organizers to deliver a memorable and impactful experience to patrons in a short amount of time.

Another challenge is the need to continuously innovate and adapt the patron experience program to keep it fresh and engaging. Festivals and conventions are often annual or recurring events, and patrons may expect new and exciting experiences each time they attend. This requires ongoing investment in research, development, creative planning, and implementation to ensure that the patron experience program remains relevant, available, and appealing to patrons.

Moreover, there may be legal and regulatory considerations that need to be taken into account when implementing a patron experience program at a festival or convention. Intellectual property rights, privacy regulations, contractual agreements, and safety and security regulations are some of the legal aspects that may impact the design and implementation of the programs. Compliance with these regulations is crucial to protect the interests of both the organizers and the patrons.

Payment transaction processing, reconciliation, and clearing at an event or function with CRM and POS systems typically involve a network of systems and entities, including financial institutions, clearing houses, and security intermediaries such as credit vaults or equivalent. Payment transactions are usually processed by capturing the relevant purchase information, such as item details and prices, and/or patron identity and account, and initiating the payment authorization process. This typically involves communicating with a payment processor or gateway, which acts as an intermediary between the CRM and POS systems and the acquiring bank or financial institution.

Once the payment is authorized, the transaction details are reconciled to ensure that the information matches across different systems, including the CRM and POS system component, the payment processor, and the acquiring bank. This reconciliation process ensures accuracy and prevent discrepancies in the transaction data. After reconciliation, the cleared transactions usually are settled, which involves the transfer of funds from the patron's account to the vendor's account. This clearing process typically involves the financial institutions, such as the acquiring bank and the issuing bank, to facilitate the transfer of funds between the patron's bank account and the vendor's bank account.

Credit vaults, which are specialized systems that store and manage credit card information securely, may play a role in the payment processing at events or functions like festivals or conventions. Credit vaults are used to securely store patrons' credit card data for future transactions, allowing for convenient and efficient payments without the need to re-enter credit card information for each transaction. The credit vaults are designed with stringent security measures, such as encryption and tokenization, to protect the sensitive credit card data from unauthorized access.

As stated above, payment processing typically involves multiple stages, including authorization, verification, and clearing of transactions. Network latency, congestion, failure, or jamming, which disrupts wireless communication signals, can interfere with these stages and disrupt the communication flow between a CRM and POS systems and the payment processor, as well as intermediaries involved in the process. For example, during the authorization stage, the CRM and POS system sends transaction details to the payment processor for verification. Network failure or jamming, if not handled according to the present disclosure, can disrupt this communication, preventing the payment processor from receiving and processing the transaction details or responding with an authorization decision. This can result in transaction failures or delays, creating opportunities for scam artists to exploit the disruptions and carry out fraudulent activities, such as making multiple transactions with fake or zero-balance accounts or making multiple transactions with stolen or irreconcilable information.

Similarly, intermediaries such as credit vaults and clearinghouses play crucial roles in payment processing, handling tasks such as account verification, transaction reconciliation, and fund clearing. Network failure jamming, if not handled according to the present disclosure, can disrupt the communication between the POS system and these intermediaries, preventing them from properly verifying accounts or clearing transactions. This can create loopholes that scam artists can exploit to bypass security measures, use stolen credit cards, or exploit accounts with zero balance, among other fraudulent activities.

I. EXAMPLE USE CASE SCENARIOS

The present disclosure generally relates to systems for and methods of implementing CRM and POS for an improved patron experience at events and functions. By leveraging the capabilities of structured CRM and POS systems according to the present disclosure to incentivize patrons, to capture and analyze customer data, to automate sales processes, to synchronize and reconcile network data, and to gain insights into customer behavior and preferences, business users can optimize their operations and provide personalized and tailored experiences to their patrons.

Moreover, embodiments and aspects of the present disclosure are directed to CRM and POS systems and methods of use thereof that can lead to increased customer satisfaction, loyalty, and, ultimately, improved sales and revenue generation. As such, the methods disclosed herein represent a significant advancement in the art, with potential applications in various industries where events and functions are held.

More specifically, one of the key advantages of CRM and POS systems according to the present disclosure is their ability to capture and analyze customer data, business intelligence data, or business insights, which can be used to create targeted marketing campaigns and personalized offers. For example, at events and functions where CRM and POS systems are implemented, CRM systems according to the present disclosure can collect customer data such as ticket purchases, attendance history, and preferences, while POS systems according to the present disclosure can capture transactional data such as purchase items and payment methods. This data can then be analyzed to gain insights into customer behavior, desires, and trends, allowing businesses to tailor their offerings and promotions to meet customer needs and expectations.

Another reason CRM and POS systems according to the present disclosure can provide for an improved patron experience is their ability to streamline sales processes and enhance operational efficiency. With CRM systems according to the present disclosure, business users can automate tasks such as customer inquiries, order management, and follow-up communications, reducing the need for manual and time-consuming processes. The POS systems according to the present disclosure, on the other hand, provide for a level of automation which translates into improved customer service, shorter wait times, and enhanced overall patron experience, especially at busy events and functions.

In addition, CRM and POS systems according to the present disclosure provide businesses with valuable insights into customer preferences/profiles, past sale, and current customer behavior, which can be used to make data-driven decisions and optimize business strategies. For example, CRM systems according to the present disclosure can generate reports on customer demographics, purchase patterns, and sales trends, while POS systems according to the present disclosure can provide data on top-selling items, inventory turnover, and sales conversion rates. These insights allow businesses to identify opportunities for targeted promotions, cross-selling, upselling, and dynamic marketing, leading to improved sales and revenue generation. Moreover, CRM and POS systems according to the present disclosure can provide real-time data on customer engagement, allowing businesses to make real-time adjustments to their offerings and promotions to enhance the overall patron experience.

Moreover, CRM and POS systems according to the present disclosure can include RFID bands as a solution for various purposes, including ticketing, access control, patron experience programs, and cashless payments. RFID bands consist of small chips that contain unique identification information and antennas for communication. These bands are typically worn by patrons as wristbands or badges and can be easily scanned or read by RFID readers placed at various locations throughout an event or function.

One common use of RFID bands according to the present disclosure is for ticketing, access control, and payment transactions. RFID bands are pre-loaded with ticket information and programmed to grant access to specific areas or events within the event or function. When patrons approach the entry points or special incentives/promotions locations, RFID readers quickly scan the bands and verify the ticket/identify information, allowing or denying access accordingly. This helps streamline the entry and/or incentives/promotion process and reduces the need for physical tickets or paper-based credentials, which can be easily lost or damaged. The RFID bands also implement a form of digital wallet, allowing attendees to load funds onto their bands and use them for transactions with vendors within the event or function.

To deal with intermittent and unreliable network connections, CRM and POS systems according to the present disclosure may implement offline or semi-offline modes for RFID bands, and/or real-time or batch transaction processing protocols. Offline mode allows the bands to function independently without relying on real-time communication with a central server or payment processor. Instead, the bands store transaction data locally and sync with the central server once a stable network connection is available. Semi-offline mode enables partial functionality of the bands even when the network connection is unstable. For example, the bands may be able to make purchases up to a certain pre-defined limit without requiring immediate online authorization. These offline and semi-offline modes help ensure that RFID bands continue to function even in network connectivity issues, allowing for smooth operation of ticketing, access control, and cashless payment systems at music festivals.

Aspects of the present disclosure implement RFID bands via complex idealized hardware and software architecture that is throughout the event environment. Thus, the solutions presented according to the present disclosure include, but are not limited to, RFID readers strategically placed at entry points, vendor locations (point-of-sale devices), and other relevant areas within the festival grounds or event environment. These RFID readers need to be capable of scanning and processing large volumes of RFID bands quickly and accurately, even in challenging outdoor environments. The festival organizers also need to deploy a reliable and secure network infrastructure, including wireless access points and back-end servers, to support the communication between the RFID bands and the central system. Moreover, proper security measures must be implemented to protect the integrity and confidentiality of the data stored on RFID bands. This may include encryption of data transmitted between the bands and the central system, as well as robust access controls to prevent unauthorized access to sensitive information. Additionally, measures must be in place to prevent counterfeit or fraudulent RFID bands, such as using tamper-evident seals or incorporating unique identifiers on the bands. The systems and methods according to the present disclosure provide solutions to all of these problems and more.

As such, CRM and POS systems according to the present disclosure may involve point-to-point or peer-to-peer (P2P) or node-to-node communications or networks. P2P or node-to-node communications or networks refers to a decentralized communication approach where devices within a network communicate directly with each other without relying on a central server. This allows devices to share data and communicate with each other even when network connectivity is limited or intermittent.

More specifically, CRM and POS systems according to the present disclosure may include ad-hoc or mesh networks. Ad-hoc networks are formed spontaneously between devices in close proximity to each other, while mesh networks are established through a network of interconnected devices that relay data to other devices within the network. These P2P or node-to-node networks operate independently of the external network, allowing devices to communicate directly with each other even when the external network connection is intermittent or unreliable. Devices at the event or function, such as RFID bands, tablets, mobile phones or device, and other peripheral or accessory devices of the CRM and POS system or related, can communicate with each other using the P2P or node-to-node network(s). For example, when a patron makes a purchase using their RFID band at a vendor, the transaction details are exchanged directly between the RFID band and the POS system component(s) through the P2P or node-to-node network(s) without the wireless access point and WIFI connection.

Furthermore, CRM and POS systems according to the present disclosure operating at least in part via P2P or node-to-node communications, for example, enable offline transactions, local caching of transaction data, and local transaction authorization. For instance, in one embodiment, transaction details may be reconciled, synchronized, and cached locally on a POS system central server or, in another embodiment with no need for a local event central server, may be cached locally among one or more components of the CRM and POS system, allowing it to process transactions even when the network connection is intermittent or unreliable. Additionally, in one embodiment, the one or more components of the CRM and POS system may contain customer token IDs that are exchanged locally to facilitate transaction processing in the present or in the future, for example.

In a mesh network, devices act as both clients and relays, forming a self-organizing and self-healing network. When a device wants to communicate with another device that is not within direct communication range, the data is relayed through other devices in the network until it reaches the destination device. This allows devices to communicate with each other even if they are not within range of a central server or access point.

CRM and POS systems according to the present disclosure may also implement distributed ledger technology (DLT) or linked list technology. P2P or node-to-node networks are designed to allow multiple nodes in a network to have equal rights and responsibilities, without relying on a central authority. This decentralization is a key feature that enhances DLT or linked list technology in various ways for purposes of the present disclosure.

First, P2P or node-to-node networks and methods according to the present disclosure improve the resilience and trustworthiness of DLT or linked list technology that is implemented by CRM and POS systems. In a P2P or node-to-node network, each node contributes to the maintenance and validation of the ledger. There is no single point of failure or control, as all nodes have an equal say in the network.

Second, P2P or node-to-node networks and methods according to the present disclosure enable the implementation of consensus mechanisms. Consensus mechanisms are used to agree or reconcile on the state of the ledger among distributed nodes. For example, Proof of Work (PoW) or Proof of Stake (PoS) are commonly used consensus mechanisms.

Third, P2P or node-to-node networks and methods according to the present disclosure distribute data across multiple nodes in the DLT or linked list. This improves data availability and reduces the risk of data loss or censorship. Data can be replicated or distributed across nodes, enhancing fault tolerance and resilience. This also allows for efficient and quick retrieval of data from neighboring nodes without relying on a central authority or intermediaries.

Fourth, P2P or node-to-node networks and methods according to the present disclosure enable horizontal scalability, as new nodes can join the network without relying on a central authority. This improves the scalability of the DLT or linked list, allowing it to handle a larger number of transactions or data. This scalability is achieved by adding new nodes to the network, which can participate in the consensus process and contribute to the distributed nature of the ledger.

Fifth, P2P or node-to-node networks and methods according to the present disclosure enhance privacy and security in DLTs or linked lists. End-to-end encryption and secure communication between nodes protect the confidentiality and integrity of data. The absence of a central point of control or failure reduces the risk of single-point vulnerabilities or attacks. This enhances the security and privacy of the DLT or linked list, making it more resilient to various threats and attacks.

CRM and POS systems according to the present disclosure also may involve or include edge network monitoring and adaptation systems operating in an event environment. The evolving edge network, which may further be a part of a larger network system, may be a distributed computing model that can bring computation and data storage closer to request or access points to provide real-time data processing, data visualization, analytics, internet of things (IoT) device management, improved data caching, filtering, buffering, transfer, and optimization, among others. The edge network can provide and leverage business intelligence through collected and accumulated data through a plurality of POS system components, for example, or other hardware and/or software. In one embodiment, the present technology can provide and leverage business intelligence through accumulated data elements via POS devices to predict, diagnose, and repair POS hardware and/or software issues as well as network issues and peripheral hardware and/or software in an event environment.

CRM and POS systems according to the present disclosure also may involve or include collecting POS data (e.g. hardware, software, connectivity and network data, transaction data) in an event environment via one or more CRM and POS system components and storing the data (e.g. data elements, data set) in one or more database systems and/or pushing the data to a data lake where the data can be stored as a raw data set or processed and stored as a processed data set. A data set (e.g. a raw or processed data set) can subsequently be leveraged and presented on one or more edge network monitoring devices, for instance as a business intelligence (BI) service dashboard or an interface for data object storage. In combination with the CRM and POS system components and/or edge network monitoring devices, the edge network system may be configured to diagnose, fix, and adapt the network or a portion of the network, for example to push power to connected devices when failing, reassign channels, perform active recovery of the network, aggregate transaction information and patron information, and predict network failures or other hardware and/or software issues.

As such, in at least one aspect, the disclosure herein is directed to methods for implementing CRM and POS merchandising systems on a node-to-node network for patron experience. In the same vein, the lessons and techniques disclosed herein are applicable to any transaction processing system.

II. SYSTEMS AND METHODS

In one aspect, the CRM and POS systems according to the present disclosure can operate as the foundation for a patron experience program(s), as they enable businesses to effectively manage business transactions and customer data on a streamlined yet adaptable software and hardware platform. In another aspect, the CRM systems according to the present disclosure is a processor-implement software platform, for example, that stores, analyzes, and gains access to (directly or indirectly) patron data, such as contact information, purchase history, credit card and payment information (or customer token IDs, for example), third-party accounts and registrations, system credits and debits and incentives/promotions (available or active), and live feedback and preloaded preferences, which can be used to create detailed customer profiles. These profiles enable business users, for example, to better understand patron preferences, behaviors, needs, and pre-existing relationships (business or otherwise).

In one aspect, a POS system according to the present disclosure is a hardware platform upon which the CRM and other systems, applications, distributed processes, network tasks, communication interfaces, etc., are run. The POS system, in at least one aspect, is equipped with hardware components such as computers, tablets, mobile devices, barcode scanners, RFID readers and sensors, NFC readers and sensors, a chip-card reader, a swipe-card reader, receipt printers, cash registers, and other peripherals and network equipment and interfaces. In particular, in another aspect, the POS system is a part of a broader point-to-point or peer-to-peer network, which includes a computing device such as a mobile phone, tablet computer, or other computing device that is capable of executing software, such as an operating system equipped with enough memory to store instructions for executing the CRM. In another aspect, example computing devices include processing circuitry, memory circuitry, and communications circuitry, to name a few components.

In one aspect, a CRM and POS system according to the present disclosure takes the form of a computer program product that includes computer useable instructions embodied on one or more computer readable media and executed by one or more processors. Computer readable media includes both volatile and nonvolatile media, removable and non-removable media, and media readable by a database, a switch, and various other network devices. Network switches, routers, access points, and related components in some instances act as a means of communication within the scope of the technology. By way of example, computer readable media comprise computer storage media and communications media, and computer storage media or machine readable media can include media implemented in any method or technology for storing and/or transmitting information or data. Examples of such information include computer-useable instructions, data elements, data structures, programs and program modules, and other data representations.

Communications media generally store computer useable or readable instructions, including data structures and program modules in a modulated data signal. A modulated data signal in some instances can be understood to be a propagated signal that has one or more of its characteristics set or changed to encode information in the signal. Communications media include any information-delivery media. By way of example and not limitation, communications media include wired media, such as a wired network or direct-wired connection, and wireless media such as radio, cellular, spread-spectrum, and other wireless media technologies. Combinations of the above are included with the scope of computer readable media and communications media.

In particular, in one aspect, a payment device, having an EMV (Europay, MasterCard, Visa) chip card reader, a magnetic stripe card reader, an NFC reader, etc., of a CRM and POS system according to the present disclosure may be in electrical communication with a processor/controller board. EMV technology is a global standard for secure payments that uses a microprocessor chip embedded in the card to generate a unique code for each transaction, making it more difficult for fraudsters to counterfeit or skim card information. NFC is a wireless communication technology that enables two devices to communicate with each other over a short distance (typically within a few centimeters). NFC is based on RFID technology and operates at a frequency of 13.56 MHz. NFC enables devices to exchange data and initiate actions by simply placing them in close proximity to each other. For example, NFC can be used to make contactless payments, transfer data between devices, and pair Bluetooth devices. NFC operates in two modes: active and passive. In active mode, both devices are powered and can exchange data with each other. In passive mode, one device is powered (e.g., a computing device) and the other device is unpowered (e.g., an NFC tag), and the powered device can read data from the unpowered device. NFC uses advanced security features, such as encryption and authentication, to ensure that communication between devices is secure and private.

In one aspect, a CRM and POS system according to the present disclosure includes a plurality of computing devices making up a point-to-point or peer-to-peer network. More specifically, in at least on aspect, each of the computing devices of the plurality of computer devices has a wireless module that is associated with forming a peer-to-peer network between the point of sale systems for inter-device communication and settling. In another aspect, the wireless module is Sierra Wireless™ modules, such as products like the EM919X/EM7690, and relies on processing chipsets such as, for example, a Qualcomm Snapdragon™ modem. These chipsets, in another aspect, broadcast in the 900 MHz frequency and thus create a peer-to-peer network across a plurality of point of sale systems. In terms of bandwidth, the 900 MHz frequency band typically provides low bandwidth transmissions, meaning that it has a limited capacity to transmit data or information, which may be ideal for payment transactions and methods according to the present disclosure. This is because the bandwidth available in this frequency range is relatively narrow compared to higher frequency bands like 2.4 GHz or 5 GHz, which can provide higher data transfer rates.

There are several advantages to using the 900 MHz frequency band for low bandwidth transmissions. One advantage is that the lower frequency allows for better penetration of walls and other obstacles, making it a good choice for applications like wireless sensors and other low-power devices that need to operate reliably in challenging environments. Another advantage is that the longer wavelength of the 900 MHz frequency band allows for greater range and better signal propagation than higher frequency bands, making it a good choice for applications that require long-range wireless connectivity, such as remote monitoring or control systems. While the 900 MHz frequency band may not be ideal for high-speed data transfer applications, it is a useful and reliable option for low bandwidth transmissions in a variety of wireless applications such as with point of sale devices and with synchronizing and reconciling transactions, for example.

In one aspect, a CRM and POS system according to the present disclosure includes an edge network having a plurality of point of sales devices (e.g., computing devices) to capture input data (e.g. transactional data, event data, network data) and/or generate device data (e.g. operational data about the device). The computing devices are within a local area network, and in some instances, the computing devices can be connected to and communicate with the network via one or more access points (wireless or wired), while in other instances the computing devices can be connected via the edge network. As such, the system can further generate data associated with the communications network itself or connected access points, servers, and/or databases. Such data can include operational information associated with the communications network and/or connected hardware, such as access points. The system can include one or more data repositories or warehouses, such as a data lake to receive and store the input data and/or device data. The data lake enables the storage of structured and/or unstructured raw data and/or processed data at any scale and can be leveraged for analytics or to guide better system decisions. Input data and/or device data can be pushed, pulled, or otherwise transmitted to the data lake in a batch process or in a continuous stream (i.e. continuous data stream). In some instances, the data lake can store and/or process data across multiple buckets. For example, the data lake stores the input data and/or device data in raw form in a first bucket and subsequently the data lake processes the data in raw form and stores the processed data in a second bucket.

In one aspect, a CRM and POS systems according to the present disclosure includes a plurality of a tablet computing devices encased in shells. Each shell may be combined with other features such as gaskets, seals, baffles, windows, ports, rigidity material, corner protectors, cable traces, and the like to accommodate the tablet computing device and peripherals. In another aspect, a controller board may be in electrical communication to the tablet computing device, the controller board serving as the single connection point to the tablet computing device such that the controller board routes data from the peripherals, as well as serves as a power modulating source (in absence the power supply) for the tablet computing device. The controller, in one aspect, has a central processing unit or a microprocessor, memory, and is configured with bus connections, and other circuitry to allow the controller to route data traffic, prioritize data feeds, and deliver power to the tablet computing device. In another aspect, patron experience programs according to the present disclosure further enhance the overall experience for patrons. As such, event management software, for example, on the tablet computing devices are utilized to manage ticket sales, seating arrangements, and event logistics, and other mobile apps are employed to engage patrons, provide real-time updates, and offer personalized promotions.

In one aspect, patron experience programs according to the present disclosure also include advanced features such as data analytics, machine learning, and artificial intelligence (AI). Data analytics, in at least one aspect, is used to analyze patron data in real-time, allowing businesses to identify trends, patterns, and opportunities for improvement. Machine learning algorithms, in at least one aspect, are employed to automatically personalize offers and recommendations to individual patrons based on their preferences, profiles, relationships, and behaviors. AI-powered chatbots and virtual assistants, in at least one aspect, are implemented to provide instant customer support and assistance during events and functions.

In one aspect, patron experience programs according to the present disclosure also involve integration with other existing systems, such as customer loyalty programs, social media platforms, credit card rewards and deals, and email marketing software. Integration with loyalty programs, in another aspect, allows businesses to reward patrons for their repeat business and loyalty, further enhancing the overall experience. Integration with social media platforms enables businesses to engage with patrons before, during, and after events, promoting brand awareness and fostering a sense of community. Email marketing software can be used to send personalized offers and promotions to patrons, nurturing ongoing relationships and driving repeat business.

III. WITH REFERENCE TO THE FIGURES

In some aspects, the disclosure herein relates to a point-of-sale system for operating in event environments. A point-of-sale system may include a computing device such as a mobile phone, tablet computer, or other computing device that is capable of executing software, such as an operating system equipped with enough memory to store instructions for executing a CRM application. Further, an application may include vendor store fronts, process sales transactions, and connect to a business intelligence suite. Example computing devices include devices with processing circuitry, memory circuitry, and communications circuitry, to name a few components.

In one aspect the computing device is encased in a weather resistant polymeric shell. The weather resistant polymeric shell is designed with a rubber inner seal around entryways to provide international standard EN 60529 and IEC 60529 IP rating 55 and above. The weather resistant polymeric shell may also comprise an adhesive to help seal, or a lubricant applied to an inner rubber seal for preservation and longevity of the weather resistance. Further, the weather resistant shell may be comprised of a polymeric material, and may also be embedded with rubber on the edges or metal may be introduced within the polymeric shell for rigidity. Weather resistance also includes resistance to dust, through baffles and the rubber inner seal. Such resistance to dust also allows for heat dissipation through the baffles. Further, the weather resistant shell may be made out of colors that display higher reflection of unwanted solar radiation. The weather resistant shell benefits from being 1) Lightweight: the weather resistant shell is lightweight, which reduces the overall weight of the device. This is important for portable point-of-sale devices, such as smartphones, tablets, and laptops; 2) Durability: the weather resistant shell is highly durable and can withstand a range of environmental conditions, such as temperature changes, humidity, and exposure to water or chemicals. This helps protect the electronic components inside from damage; 3) Insulation: the weather resistant shell provides electrical insulation, which helps prevent short-circuits and other electrical problems; 4) Cost-effective: the weather resistant shell is often less expensive to manufacture than other materials, such as metal or glass. This makes the design a cost-effective option for protecting the electrical components, such as the computing device and controller board.

A computing device, such as a tablet computing device within a point-of-sale device, as understood from this disclosure, includes a processor and a memory that communicate with each other, and with other components, via a bus. A bus can include any of several types of bus structures including, but not limited to, a memory bus, a memory controller, a peripheral bus, a local bus, and any combinations thereof, using any of a variety of bus architectures.

Memory can include various components (e.g., machine-readable media) including, but not limited to, a random-access memory component, a read-only component, and any combinations thereof. In one example, a basic input/output system (BIOS), including basic routines that help to transfer information between elements within computer system, such as during start-up, can be stored in memory. Memory can also include (e.g., stored on one or more machine-readable media) instructions (e.g., software) embodying any one or more of the aspects and/or methodologies of the present disclosure. In another example, memory can further include any number of program modules including, but not limited to, an operating system, one or more application programs, other program modules, program data, and any combinations thereof.

Point-of-sale devices, computing devices, can also include a storage device. Examples of storage devices include, but are not limited to, a hard disk drive, a magnetic disk drive, an optical disc drive in combination with an optical medium, a solid-state memory device, and any combinations thereof. Storage device can be connected to bus by an appropriate interface. Example interfaces include, but are not limited to, SCSI, advanced technology attachment (ATA), serial ATA, universal serial bus (USB), IEEE 1394 (FIREWIRE), and any combinations thereof. In one example, a storage device (or one or more components thereof) can be removably interfaced with the point-of-sale device (e.g., via an external port connector). Particularly, a storage device and an associated machine-readable medium can provide nonvolatile and/or volatile storage of machine-readable instructions, data structures, program modules, and/or other data for the point-of-sale device. In one example, instructions can reside, completely or partially, within machine-readable medium. In another example, instructions can reside, completely or partially, within processor.

A user may also input commands and/or other information to the point-of-sale device via a storage device (e.g., a removable disk drive, a flash drive, etc.) and/or network interface device. A network interface device, such as network interface device, can be utilized for connecting the point-of-sale device to one or more of a variety of networks, and one or more remote devices connected thereto. Examples of a network interface device include, but are not limited to, a network interface card (e.g., a mobile network interface card, a LAN card), a modem, a wireless module, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/ or voice network), a direct connection between two computing devices (mesh network), and any combinations thereof. A network, generally speaking, can employ a wired and/or a wireless mode of communication. In general, any network topology can be used.

Software-Defined Networking (SDN) is an approach to networking that separates the control plane (which determines how traffic is routed) from the data plane (which forwards packets). This separation allows network administrators to manage network behavior through software-based controllers, rather than through physical hardware devices. SDN enables more flexible, efficient, and cost-effective management of network infrastructure by centralizing control of network functions and automating network management. With SDN, network administrators can easily allocate network resources, prioritize traffic, and monitor network performance in real-time. SDN is implemented using a combination of hardware and software technologies, including programmable network switches, wireless access points (routers, gateways), network controllers, and network virtualization software. These components work together to enable network administrators to create logical networks that can be customized to meet the specific needs of their organization. SDN allows for the ability to automate network management tasks, which can significantly reduce the workload for network administrators. For example, SDN can be used to automatically configure network policies, adjust network bandwidth, and optimize network performance based on real-time traffic patterns. Further, SDN networks may diagnose congestion, shift resources, and perform optimization, of which may increase service and reliability from point-of-sale devices in event environments.

In one aspect a Wireless Local Area Network (WLAN) is utilized to provide Internet communications and connectivity to the point-of-sale devices. WLAN is a type of network that allows devices to connect and communicate with each other wirelessly using radio waves instead of cables. In a WLAN, point-of-sale devices connect to a wireless access point (WAP) that is connected to a wired network. The WAP acts as a bridge between the wireless and wired networks, allowing devices to communicate with each other and access resources such as printers and file servers. WLANs can be set up using different wireless technologies, such as Wi-Fi, Bluetooth™, or Zigbee™. Wi-Fi is the most commonly used wireless technology for WLANs, and it operates on a set of standards defined by the IEEE 802.11 protocol. Wi-Fi allows devices to connect to a network over a range of several meters to several hundred meters, depending on the strength of the wireless signal and any obstacles that may be present.

In another aspect, a mesh network is disclosed. A mesh network is a type of network topology in which each node (or point-of-sale device) in the network is connected to multiple other nodes (point-of-sale devices), rather than relying on a single centralized hub. This allows for more efficient and reliable communication between devices, as each device can act as a relay for other devices in the network. In a mesh network, each node is responsible for routing data to its destination. If one node fails or becomes disconnected, the network can automatically reroute data through other nodes to reach its destination, ensuring that the network remains functional even if individual nodes fail. Mesh networks can be one solution in situations where traditional networks may be impractical or unreliable, such as in large event environments (festivals, arenas, large outdoor gatherings) or in disaster situations where traditional communication infrastructure has been damaged or destroyed. Further, mesh networks may be utilized to form an Internet of Things (IoT) between various other hardware and software embodiments at an event environment. Wherein the devices need to communicate with each other without relying on a centralized hub. A key advantage of mesh networks is their scalability, and various aspects of the scalability are disclosed herein. Namely, each node in the network can act as a relay, the network can easily be expanded by adding more nodes, without the need for a centralized infrastructure.

Referring now to FIG. 1, a front view illustration of an example point-of-sale device 100. According to example embodiments disclosed herein, the point-of-sale device is comprised of a tablet computing device 104, which is configured with processing circuitry, memory circuitry and communications circuitry. The tablet computing device 104 is connected via a cable to the payment device 102, wherein the payment device is configured to accept payment. Examples of payment are through near field communications, such as an RFID enabled payment vehicle (bracelet, card, object), or through a chip card or a swipe card. Examples of payment devices that may be incorporated herein is the bbPOS Chipper™ https://stripe.com/docs/terminal/readers/bbpos-chipper2xbt the scope of which is referenced herein in the entirety.

In one aspect the point-of-sale device 100 is encased in a weather resistant polymeric shell. The weather resistant shell is designed with a rubber inner seal around entryways to provide international standard EN 60529 and IEC 60529 IP rating 55 and above. The weather resistant polymeric shell 110 is typically comprised of two pieces, a top piece and a bottom piece, windows for viewing and RF communications, and void regions defined within the interior for accepting the computing device (tablet computer, mobile computer, smartphone) and peripherals (payment device 102, wireless module 152, power module, controller board). Further, the weather resistant polymeric shell 110 is held together by fasteners 108, which may comprise screws, bolts, or other elements to compress an inner seal to provide the weather resistant aspects. The weather resistant shell 110 may also comprise an adhesive to help seal, or a lubricant applied to an inner rubber seal for preservation and longevity of the weather resistance. Further, the weather resistant shell may be comprised of a polymeric material, and may also be embedded with rubber on the edges or metal may be introduced within the polymeric shell for rigidity. Weather resistance also includes resistance to dust, through baffles and the rubber inner seal. Such resistance to dust also allows for heat dissipation through the baffles. Further, the weather resistant shell may be made out of colors that display higher reflection of unwanted solar radiation. The weather resistant shell benefits from being 1) Lightweight: the weather resistant shell is lightweight, which reduces the overall weight of the device. This is important for portable point-of-sale devices, such as smartphones, tablets, and laptops; 2) Durability: the weather resistant shell is highly durable and can withstand a range of environmental conditions, such as temperature changes, humidity, and exposure to water or chemicals. This helps protect the electronic components inside from damage; 3) Insulation: the weather resistant shell provides electrical insulation, which helps prevent short-circuits and other electrical problems; 4) Cost-effective: the weather resistant shell is often less expensive to manufacture than other materials, such as metal or glass. This makes the design a cost-effective option for protecting the electrical components, such as the computing device and controller board.

As depicted in FIG. 1, the display of the computing device 104 is positioned within a window in the weather resistant polymeric shell 110, wherein the display may further comprise additional shielding or a glare reducing layer. In this aspect, the payment device 102 in encased within the weather resistant polymeric shell, and a portion is external through a window to allow for financial transactions. In an additional aspect there may be a radio transmission window 512 of non-radio frequency interfering material, such as a thin plastic shroud, that allows for an antenna to be located beneath, or for NFC communications.

Continuing, a wireless network module 152 is disclosed and connected to an antenna 154. Example wireless network modules 152 for communicating across a mesh network topology include the DigiMesh™ Digi XBee SX 900 RF Module, Sierra Wireless™ LPWA Modules, and Sierra Wireless™ Smart Modules such as the EM919X series, to name a few. Additional wireless modules may be employed, and will be recognized by those of skill in the art. In one aspect, the wireless module is selected to perform optimally on low power and through a congested network. Further, the functional amount of data transferred across the mesh network is often low, thus embodiments that are configured for low power and low bandwidth perform optimally for event environments. However, many other network aspects may be employed, such as the 2.4 GHz band, the 5 GHz band, as well as cellular communications bands, to name a few. Further, certain aspects may include frequencies on each of the wireless network modules could operate on any of ISM band frequencies of 4.33 GHZ, 915 MHz, 2.4 GHz to 5 GHz. In a preferred aspect for event environments, a low frequency, low bandwidth 900 MHz network is established on a mesh network topology, wherein each of the plurality of point-of-devices is capable of receiving and transmitting information, and thus the point-of-sale devices take physical operation as each serves as a wireless access point. This is depicted even further in the figures, and aspects of network adaptability are key components of the disclosure herein.

In one aspect, broadcasting on a mesh network refers to the process of sending a message from one point-of-sale device (node) to all other point-of-sale devices (nodes) in the network. In an example mesh network, point-of-sale devices are connected to each other in a decentralized manner, forming a mesh-like topology. This allows for efficient routing of data packets between the point-of-sale devices, as the network can automatically find the best path between the sender and the receiver. When a point-of-sale device wants to broadcast a message, it sends the message to all its neighbors, who in turn forward the message to their own neighbors, until the message has been received by all point-of-sale devices in the network. The propagation of the message can be optimized by using various techniques such as flooding control and adaptive forwarding, which prevent the message from being forwarded unnecessarily and reduce network congestion. Broadcasting on a mesh network can also result in a number of challenges. One of the main challenges is resolving propagation issues, such as collisions and message loss. In one aspect, the point-of-sale devices are configured to repeat a specific number of times, prior to ending the forward. Collisions occur when multiple point-of-sale devices try to broadcast messages simultaneously, causing interference and potentially corrupting the messages. Message loss occurs when a point-of-sale device fails to receive a broadcasted message due to network congestion or other reasons. To resolve propagation issues, mesh networks may use various mechanisms such as collision avoidance techniques like Carrier Sense Multiple Access with Collision Avoidance (CSMA/CA), which helps prevent collisions by ensuring that nodes wait for a clear channel before broadcasting a message. Additionally, retransmission mechanisms can be used to ensure that lost messages are retransmitted until they are successfully received.

As will be apparent from the systems and methods disclosed herein, many aspects and networking protocols may be employed to build resiliency in payment processing and the collecting of business intelligence. In one aspect, the point-of-sale device is configured with a Low-Power Wide-Area (LPWA) network module, wherein the point-of-sale devices form nodes, with the goal of positioning the point of sale devices so that at least one unit is within an active connection to the Internet so as to reach a financial institution to verify credit, or to resolve a ledger of credits, and to further collect business intelligence. In this aspect, one point-of-sale device may be positioned to communicate with a cellular network, in other embodiments it may be a wireless access point, and in other embodiments it may be to a local server that is connected through a LAN to the Internet. In all aspects, the point-of-sale devices, through the network module, become a swarm network and allow for resiliency when the traditional WLAN network integrated within the computing device fails.

Figure 2:
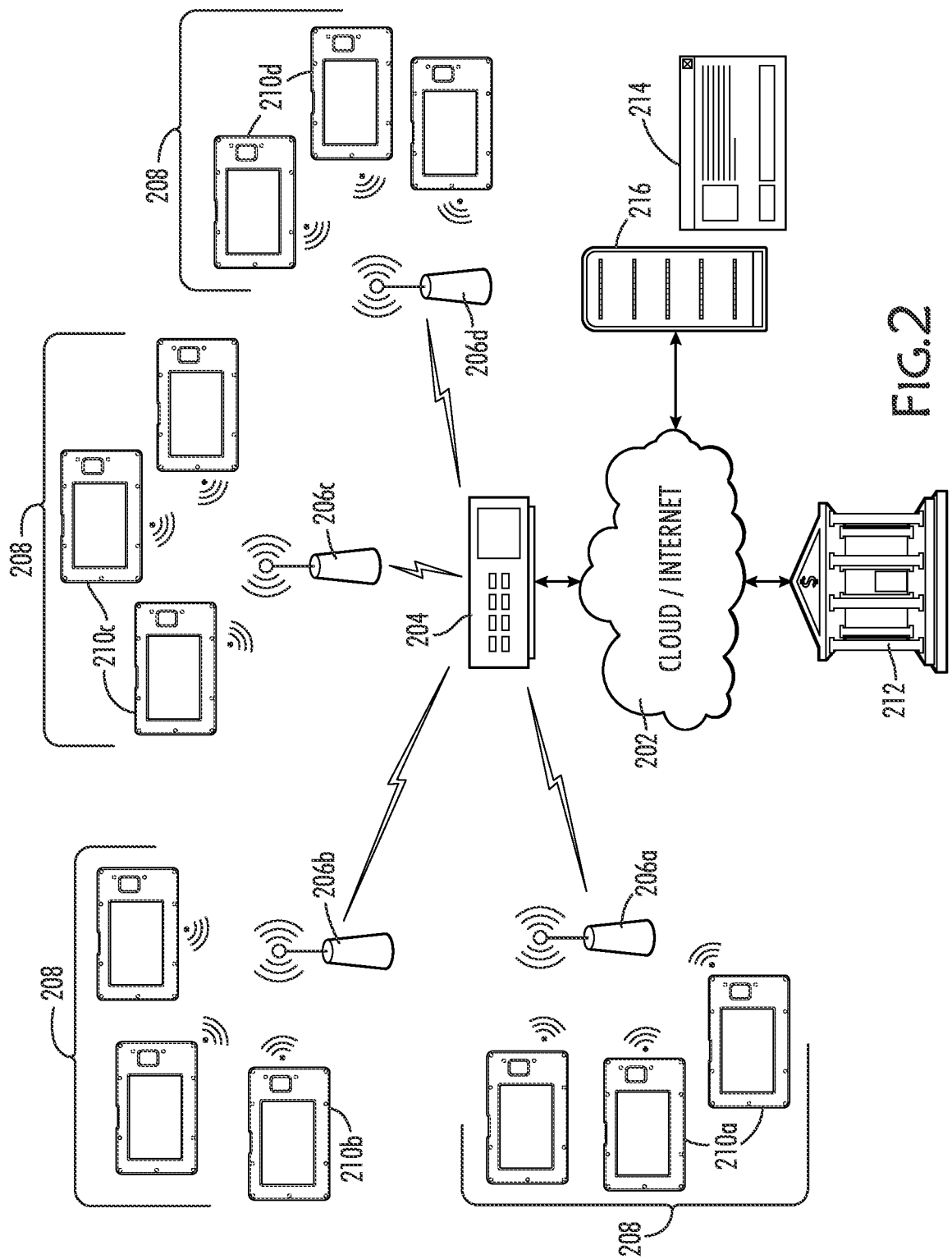
FIG. 2 is an illustration of an example WLAN network connected to a plurality of point-of-sale devices.

Referring now to FIG. 2, an illustration of an example WLAN network connected to a plurality of point-of-sale devices. This aspect discloses a traditional networking connection of a plurality of devices at an event through a WLAN. In this aspect, the event environment is broken into several event spaces 208, wherein event spaces may be different vendor locations spread across an event environment. Such as vendor stations set up across a music festival, sporting event, or other outdoor commercial environment. The plurality of point-of-sale devices 210, are connected to a plurality of access points 206, and each are spread throughout the event environment. The access points 206 are connected through wired or wireless connection to a modem 204, or other network device, such as a switch, and then connected to a modem 204 that has established communication with the Internet 202. As disclosed previously, the point-of-sale devices operate through a customer relationship management (CRM) application, in which the CRM application further houses the payment applications, along with business information functionality.

Continuing, the WLAN model in FIG. 2, connects to the internet and then to the various financial institutions 212 of the payment vehicles in which patrons are utilizing. For example, if a customer presents a Bank of America™ card, the point-of-sale device will process the transaction by settling the requested amount with the patron's payment issuing financial institution. Often times this is resolved by an intermediary, it will be known to those of skill in the art the settling of a balance on a payment vehicle, such as a credit card. This includes settling of a ledger or other sponsor funds associated with, for example, an RFID wristband or other RFID enabled device that stores a unique frequency or serial that is associated with a user's funds.

In one aspect, processing a financial transaction on a point-of-sale device comprises receiving payment information (payment vehicle) from a purchaser at a merchant/vendor site. Then the transaction details, such as the amount at issue, the payment vehicle information, and the settling account are transmitted to an issuing financial institution. The issuing financial institution approves or declines, and transmits back to a payment processor, or to the point-of-sale device. There are many avenues that the financial transaction data may take, including various registries, payment processors, or clearing houses, regardless of the pathway the point-of-sale devices must be able to maintain a stable and reliable connection to the Internet and external servers to allow for payment processing. Thus, the dual network disclosure herein provides redundancy, as well as allows a unique set of design parameters that allow the point-of-sale devices to process transactions across a remote environment.

Continuing, the mesh network in the dual network disclosure provides the ability to also collect business intelligence, and to synchronize a ledger of funds, such as sponsor funds that may be preloaded prior to an event. In this aspect, the mesh network, comprised of low frequency low bandwidth wireless modules (900 MHZ), are designed to be compact, and for reduced power draw (typically less than 1 watt), are configured within each of the plurality of point-of-sale devices. Therefore, when one access point fails, the mesh network may trigger, in which a propagated financial transaction request may reach a second point-of-sale device that has a stable connection to a second access point, allowing for the financial transaction to complete. In other aspects, the network may be cellular, and may broadcast on 2G spectrum, such as 850, 900, 1800, and 1900 MHz spectrum.

Figure 3:
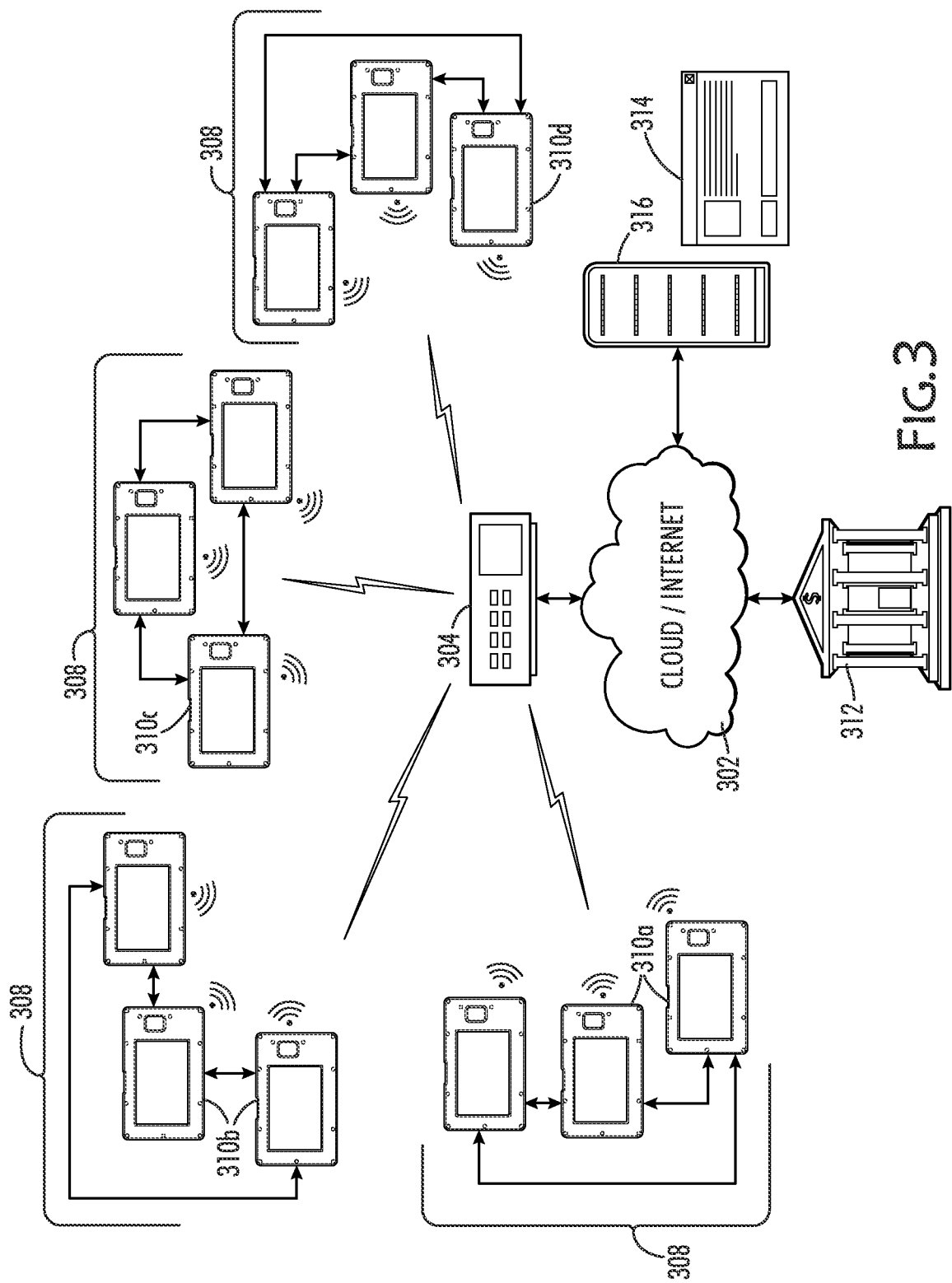
FIG. 3 is an illustration of an example mesh network across a plurality of point-of-sale devices.

Referring now to FIG. 3, an illustration of an example mesh network across a plurality of point-of-sale devices at an event environment. In this aspect, the point-of-sale devices 610 comprise an additional onboard wireless module configured to operate with onboard parameters, wherein the wireless module is provided within a void region, and secured safely within the polymeric shell. In this aspect, the wireless module operates on a low bandwidth, low frequency, chipset that allows reduced power draw and strong performance within limited ranges, for example up to 10,000 feet. The onboard wireless module allows for a mesh connection across the plurality of point-of-sale devices, therein providing redundancy and allowing for additional data transfer, removed from the traditional WLAN network. As such, the mesh network, in some aspects, may be able to transmit and synchronize sponsor funds on a local ledger or database, in which funds may be reconciled without the need for an external facing connection. In this aspect, sponsor funds would be preloaded onto the devices, and the mesh network would synchronize transactions to ratify a balance. Further, the mesh network may operate with a level of encryption that is PCI DSS compliant, including 256-bit AES encryption on transferred data packets.

Continuing, in the example of FIG. 3, the mesh network connects to a plurality of vendor zones 308, that are located across an event environment. The vendor zones 308 each comprise a plurality of point-of-sale devices 310 to process various transactions, such as food and beverage, or merchandise transactions. The point-of-sale devices 310 each form a node, and are configured to send and receive instructions, thereby allowing a propagation of a request throughout the plurality of point-of-sale devices. As discussed previously, this mesh architecture allows for a P2P network, wherein any one failure may be overcome by propagating instructions to a neighbor that has an established Internet connection. In doing so the network becomes resilient against faults, and allows financial transactions to complete in the harshest of environments.

The gateway or modem 304 is then connected to, typically through a switch or other network hardware, the plurality of point-of-sale devices. Wherein the connection is based on a node to node mesh environment, thus the nearest point-of-sale device may establish the connection to the cloud/internet 302. In any event, through the mesh environment a connection is made to an outside financial institution 312, or to another credit processor, thus allowing the processing of financial transactions on a low frequency low bandwidth mesh network, hosted on point-of-sale devices, spread throughout an event environment.

Figure 4:
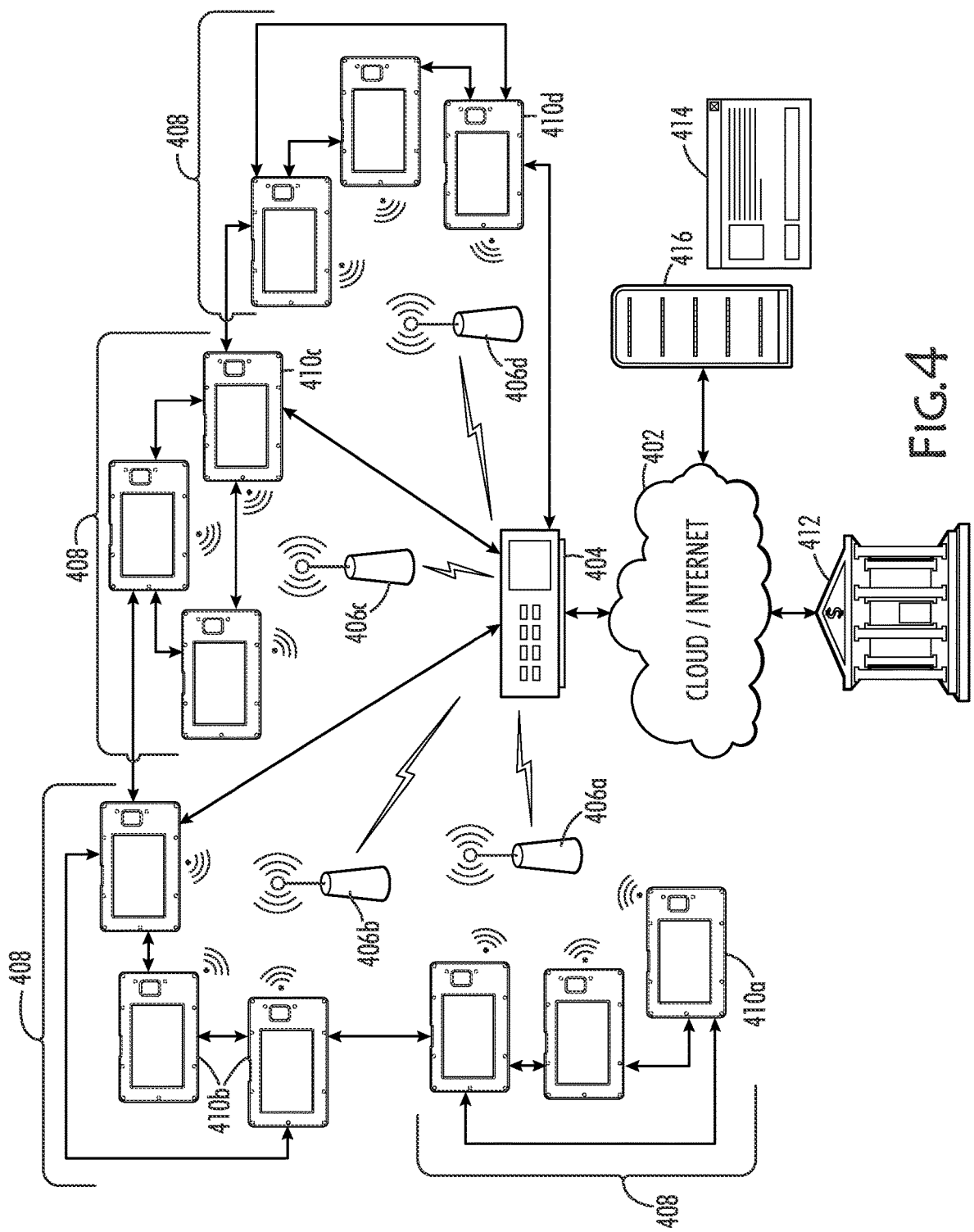
FIG. 4 is an illustration of an example mesh network and WLAN network connected to a plurality of point-of-sale devices.

Referring now to FIG. 4 an illustration of an example mesh network and WLAN network (dual network) connected to a plurality of point-of-sale devices. This aspect comprises a dual network configuration, wherein the WLAN network, enabled by the wireless module onboard the computing device, provides a wireless connection (2.4 GHz, 5 GHZ, etc.) to a wireless access point, or simply an access point. In this aspect, a dual networked point-of-sale system for operating in event environments is disclosed. Wherein a plurality of point-of-sale devices, each point-of-sale device comprising a computing device, a payment device, and a wireless network module, integrated within a shell. The integration may be within void regions, recesses, gaps, and other configurations within the shell that allows the peripheral components to be protected from elements at an event environment. In one aspect, referring to FIG. 4, a wireless local area network is disclosed, the WLAN network comprising a first access point 406a in wireless communication with a first point-of-sale device 410a. The WLAN network also comprising a second access point 406b in wireless communication with a second point-of-sale device 410b from the plurality of point-of-sale devices. As depicted there can be any number of access points connected to point-of-sale devices, and the number is determined by the network spread, and reach of a WLAN configuration, along with the number of point-of-sale devices connected.

Continuing, in FIG. 4 a gateway and switch 404 is in wired or wireless communication with the first access point 406a and the second access point 406b, that allows the first point-of-sale device 410a and the second point-of-sale device 410b to communicate with a financial institution 412. Additionally, FIG. 4 comprises a second network, a mesh network. Wherein the mesh network comprises each of the plurality of point-of-sale devices 410 forming a node, and wherein upon a failure of the first access point 406a initiates the first point-of-sale device to attempt a connection through the wireless network module to the gateway through the wireless network module on the second point-of-sale device that is in communication with the second access point. This builds in the resiliency by allowing the mesh network to operate to "search and find" an access point, or cellular tower to connect out of the network.

Continuing with FIG. 4, further disclosed is a dual networked point-of-sale method for operating at an event environment. In this aspect the event environment is provided with a plurality of point-of-sale devices 410 at separate event locations or spaces 408, each point-of-sale device comprising a computing device, a payment device, and a wireless network module, integrated within a shell. In the method the next step is establishing a WLAN at an event environment. This occurs through the first access point 406a in wireless communication with a first point-of-sale device 410a. It further continues by connecting subsequent point-of-sale devices to near access points to establish a WLAN network. The WLAN network is connected to a modem in wired or wireless communication. The network connection allows the first access point and the second access point to communicate with a financial institution, through the modem.

The method of FIG. 4 further comprises establishing a mesh network at the event environment. The mesh network comprises each of the plurality of point-of-sale devices 410 forming a node, and wherein upon a failure of the first access point 406a initiates the first point-of-sale device 410a to attempt a connection through the wireless network module to the gateway through the wireless network module on the second point-of-sale device 410b that is in communication with the second access point 410a.

Figure 5:
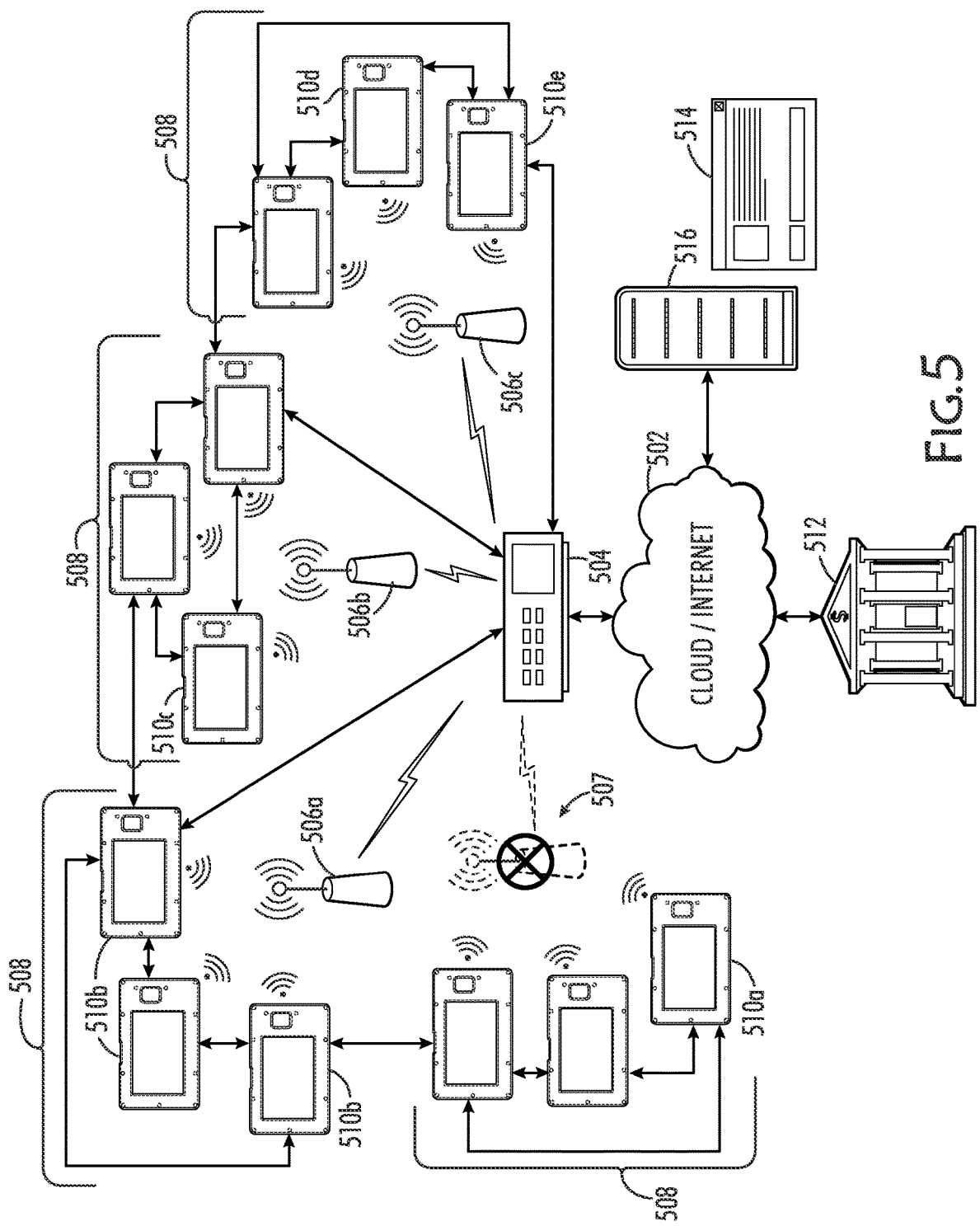
FIG. 5 is an illustration of an example network failure of an access point in the systems and methods described herein.

FIG. 5 is an illustration of an example network failure of an access point in the systems and methods described herein. In this aspect, a method is disclosed for clearing a financial transaction at an event environment when an access point fails. The method comprises providing a first point-of-sale device 510a wirelessly connected to a first access point 507, wherein the first access point 507 is in connection to an external network 502, typically through a gateway 504. A gateway may be a modem, and typically is a series of switches that connect to various routers or access points, and then form a centralized connection with the gateway device. Next, in the method disclosed in FIG. 5, providing a second point-of-sale device 510b that is wirelessly connected to a second access point 506b, wherein the second access point 506b is in connection to the external network 502 through a gateway 504. Then, attempting a financial transaction request on the first point-of-sale device 510a, wherein attempting transmits financial transaction data payload to the first access point 507 connected to the external network that is in communication with a financial institution. When attempting to connect to the financial institution 512 or payment processor, the point-of-sale device 510 receives a failure or no response to the financial transaction. This is due to the wireless access point 507 being disconnected/failing to communicate to a gateway 504 and then to the internet 502. This failure may be related to software or hardware, and is prone to happening in event environments.

When presented with a network failure, the point-of-sale device may activate and connect through a mesh network to the second point-of-sale device 510b, wherein the second point-of-sale device 510b has network connection to the external network 502 through the second access point 506a. Once connected to the financial institution 512, then processing the financial transaction request by transmitting the financial transaction data payload through the first point-of-sale device 510a to the second point-of-sale device 510b, wherein the second point-of-sale device 510b transmits the financial transaction data payload through the second access point 506a to the financial institution. This method may also comprise receiving by the second point-of-sale device 510b from the financial institution 512, approval of the financial transaction request, which authorizes the transaction and completes a sale. The foregoing method may be applied to sponsor funds, wherein a cloud server 516 may reconcile the sponsor funds based on a ledger. This allows pre-loaded funds to be processed on the same dual network setup, allowing for events to offer preloaded fund cards and other alternative forms of payment.

Figure 6:
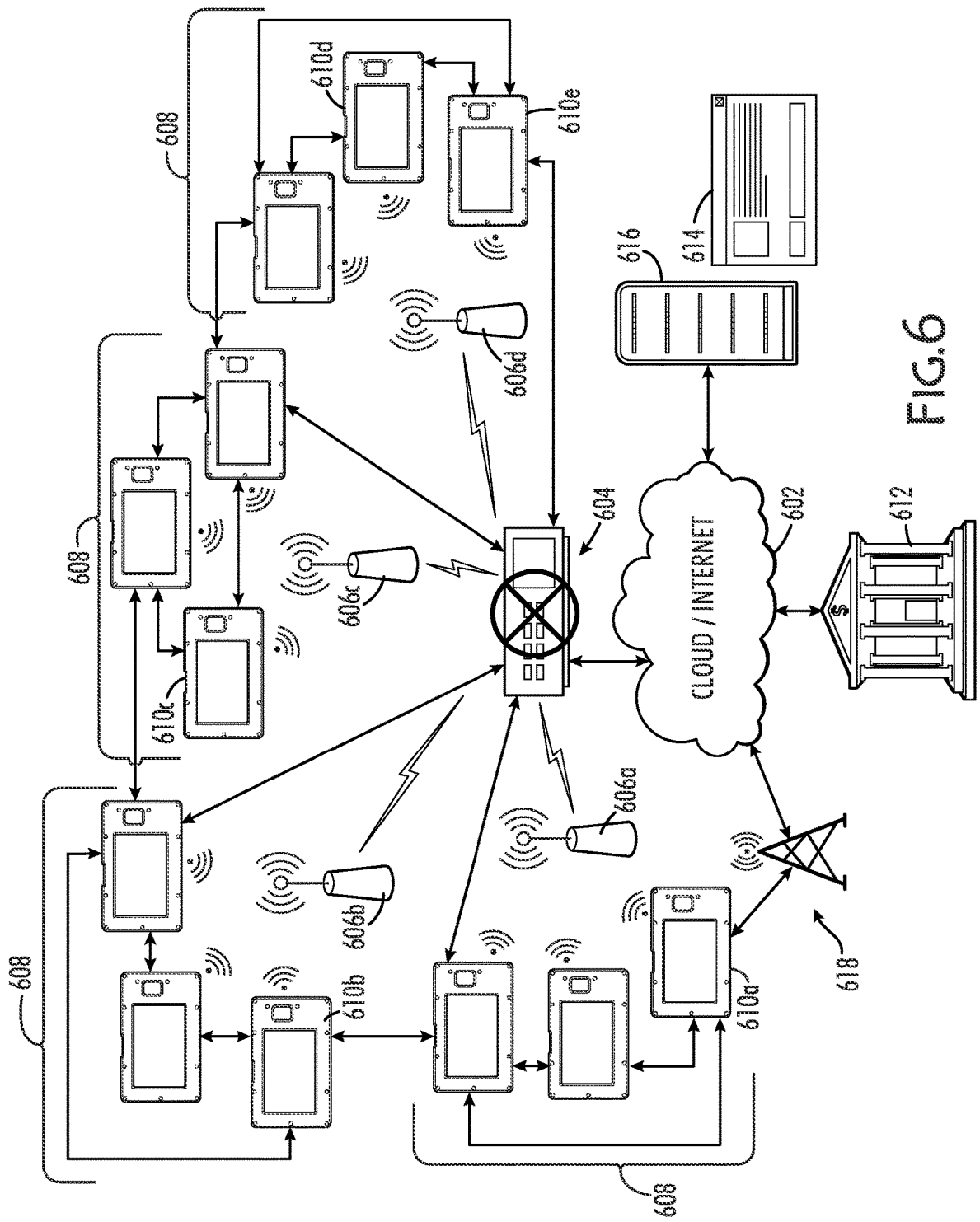
FIG. 6 is an illustration of an example network failure of a modem or gateway connecting device in accordance with the systems and methods described herein.

Referring now to FIG. 6, an illustration of an example network failure of a gateway 604 or modem in accordance with the systems and methods described herein. In this aspect the gateway 604 may become disconnected from the internet 602, thus the traditional WLAN network and the mesh network may fail to connect to the financial institution 612. In this aspect, a cellular modem on the first point-of-sale device 610 may be activated and connected to a cellular network 618, which in turn may reach the Internet 602. In this aspect, the P2P or node to node connected mesh network may propagate instructions across the various services areas 608, until it connects to the first point-of-sale device 610a, wherein it communicates across the cellular network 618 to the Internet 602 and then to a financial intuition 612 or a server 616 for clearing the transaction.

Further aspects include configuring the mesh network to activate on a cellular network, in turn allowing the plurality of point-of-sale devices to transmit instructions to those devices that are in working communication with the internet 602. Additional aspects allow the collection of business intelligence across the mesh network, wherein the business intelligence may be stored locally as a structured data set on each point-of-sale device, and then propagated to the server 616 when the event is over so as to not overload the network. In further aspects, the information and business intelligence may be transferred in real time to aid in operational activities of the dual networked point of sale system.

Figure 7:
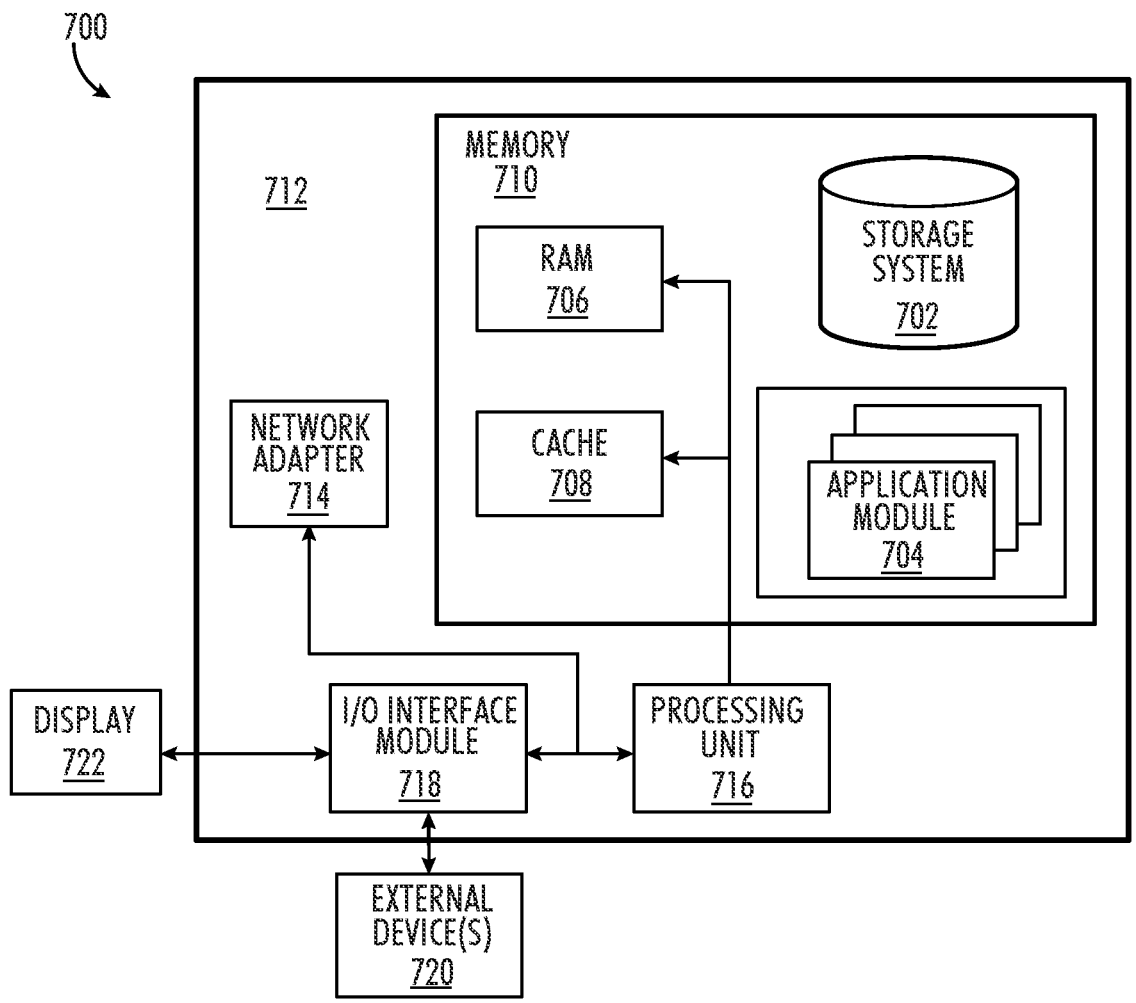
FIG. 7 shows a schematic illustration of example internal components of a dedicated mobile computing device for a CRM and POS system (not shown) according the present disclosure.

Referring now to FIG. 7, a schematic illustration of example internal components of a dedicated mobile computing device for a CRM and POS system (not shown) according the present disclosure is shown. The dedicated mobile computing device 700 as described herein is a special purpose computing device.

In particular, as illustrated in FIG. 7, a computer system 712 of the dedicated mobile computing device 700 includes several components. The computer system 712 contains a storage system 702 comprised of solid-state drive technology. The storage system 702 may also be equipped with any other hard drive technologies for the storage of computing information.

For example, a CRM and POS system according the present disclosure includes application(s), instruction(s), and data that reside long term on the storage system 702. The memory 710 of the computing system 712 also includes Random Access Memory (RAM) 706 which holds the program instructions along with a cache 708 for buffering the flow of instruction/data to the processing unit 716, for example. As such, the memory 710 comprises computer storage media and communication media, and includes both volatile and non-volatile media and removable and non-removable media.

By way of example, the memory 710 includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store a desired information for access by a processor(s) or processing unit(s). The memory 710 also includes computer-readable instructions, data structures, program modules or other data in a modulated data signal, such as a carrier wave or other transport mechanism, and includes any information delivery media. A modulated data signal refers to a signal that has one or more of its characteristics set or changed in such a manner as to encode information in the signal. Furthermore, the memory 710 includes or involved wired media such as a wired network or direct-wired connection, and wireless media such as acoustic, RF, infrared, NFC, Bluetooth®, cellular, and other wireless media. Combinations of any of the above are included within the scope of the memory 710.

Returning generally to FIG. 7, often times the executed application module(s) 704 reside in the RAM 710 as instructions executed by the processor(s) or processing unit(s) 716. As such, the processing unit(s) 716 is communicatively coupled through a bus to a network adapter 714 that facilitates communications via network cards, wireless, Bluetooth®, and local area network adapters, for example. The processing unit 716 also is communicatively coupled through a bus to an input/output interface module (IO) 718 that is connected to a display 722, which displays a GUI of the CRM and/or POS application(s), for example, and to other external peripheral input/output devices or components, for example. The IO module 718 also is configured to interface with other external devices 720 such as a universal serial bus adapter, lightning port, power port, and/or a whole host of other IO devices that are traditionally found interfacing with a general-purpose and/or a special purpose device as described herein.

Figure 8:
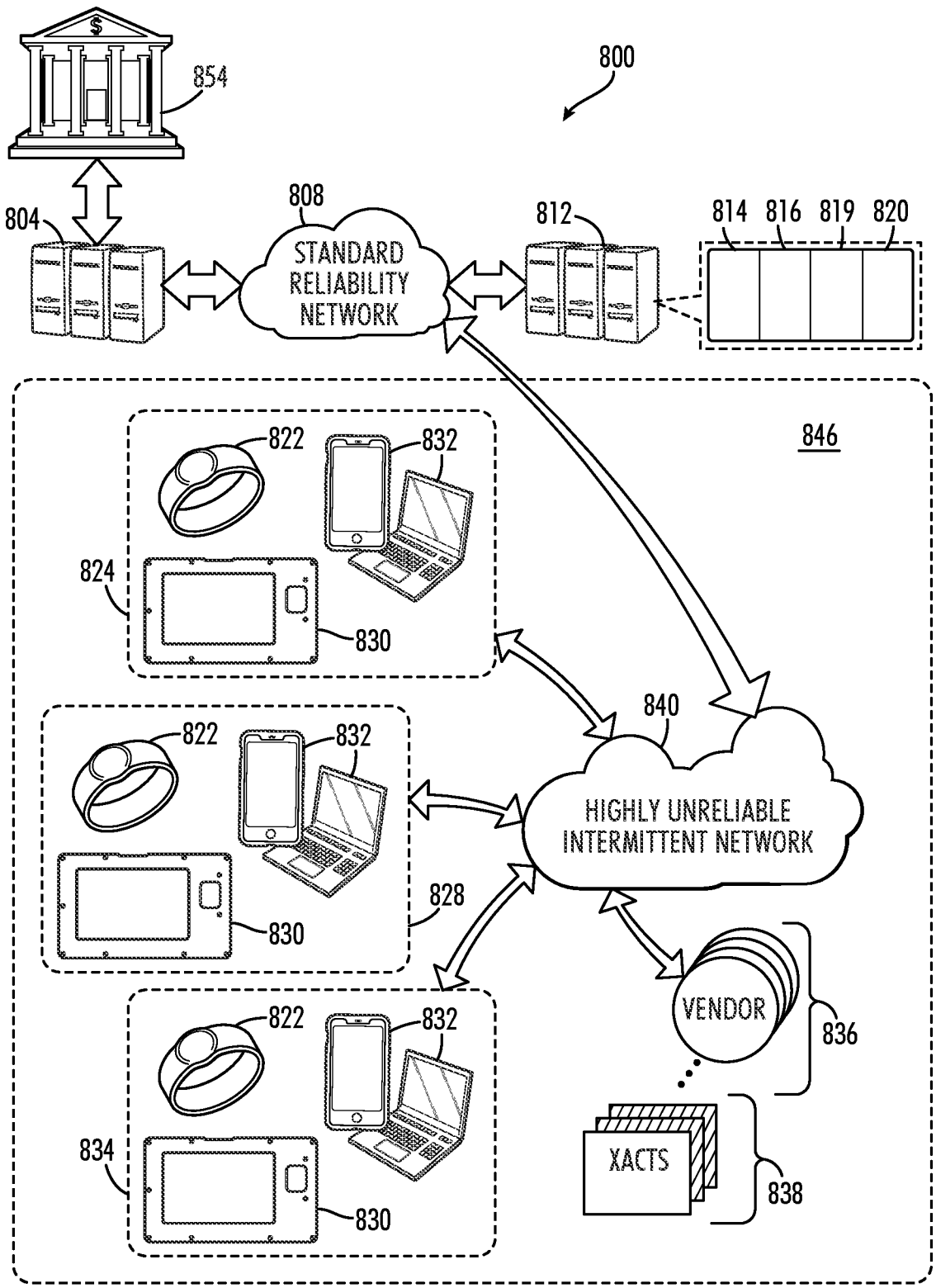
FIG. 8 shows a plan view of an illustration of an example CRM and POS system according to the present disclosure.

Referring now to FIG. 8, a plan view of an illustration of an example CRM and POS system according to the present disclosure. The CRM and POS system 800 is a subset of a broader Enterprise Resource Planning (ERP) system (not shown) and the CRM and POS system 800 facilitates actions for the ERP system. A portion of the CRM and POS system 800 also is framed in an event (or function) 846 such as a music festival or convention.

As illustrated in FIG. 8, the event 846 includes a patron(s) wearing an RFID band(s) 822 going amongst various event 846 vendors, in particular, a merchandise vendor 824, a concessions vendor 828, and a services vendor 834, along with a host of example vendor transactions 838 as described herein. Additional vendors 836 include retail vendors, e-commerce vendors, sponsor or sponsor-affiliated vendors, etc. The vendors 824,828,836,838 as illustrated in FIG. 8, are each equipped with a dedicated POS computing device 830 (best seen in FIG. 1) and other peripheral computing devices 832 such as mobile computing devices and peripheral/external devices. Further explanation of a dedicated POS computing device 830 such as a dedicated personal computer device is found herein with reference to FIGS. 1 and 7.

Returning generally to FIG. 8, the POS computing device 830 performs network communications and exists in the network topology as described for FIGS. 1-6 and at the event 846 and, therefore, connects to the internet and other networks over a highly unreliable intermittent network 840. The same is true for the other peripheral computing devices 832. The POS computing device 830 also is connected via the peer-to-peer or node-to-node network (not shown; best seen in FIGS. 1-6, for example) as described herein. The POS computing device 830 also is configured to execute a payment processing vendor application that is configured with the vendor's goods and/or services (not shown). The vendor application executing on the POS computing device 830 and/or the peripheral computing devices 832 is configured for each of the vendors 824, 828, 836, 838 and shown/made available through a GUI (not shown; best seen in FIG. 9A) on the display of the POS computing device 830, for example.

More specifically, the application executing on the POS computing device 830 and/or the peripheral computing devices 832 is a store front GUI for the vendor to processes a sale and upon which at least a portion of the CRM system (such as a patron experience program offering patron incentives and/or sponsored promotions) and method can be implemented. The application is dynamic and receives updates from the CRM and POS server 812 (situated outside of the highly unreliable intermittent network 840) for customization of products and services, for consolidation of all transaction 838 data, and for processing of transactions, wherein "customization of products and services" includes adding new buttons for goods or services for sale and adding new functionality such as tax variance, tip options, NFC payment options, sponsor or promotion options, for example. The application also further receives from the transaction server 112 information on whether or not the transaction is processed.

The transaction server 812, as illustrated in FIG. 8, is a server that can be customized to run applications and store data for the CRM and POS system 800 to function. The transactions server 812 updates the dedicated mobile computing devices 830, each executing the vendor application 832 in reliance on the goods and services each of the plurality of vendors 836 transacts 838. The transaction server 812 is equipped to push information through the highly unreliable intermittent network 840 to each of the dedicated POS computing devices 830. The network communications operate as disclosed herein with reference to FIGS. 1-6 and as disclosed in the applications incorporated by reference, and are implemented to transfer of information from the plurality of dedicated mobile computing devices 830 to the transactions server 812 and/or, ultimately, to the financial institution intermediary server(s) 804.

The financial institution intermediary server 804, as illustrated in FIG. 8, is a server that a dedicated payment processing intermediary, such as a credit vault institution, for example, has between the CRM and POS system 800 and the ultimate issuing financial institution(s) 854 for any given transaction(s) 838. Issuing financial institutions (154) are financial institutions that give credit through various payment vehicles as disclosed herein or as disclosed in any of the applications incorporated by reference. Typical financial issuing institutions include Bank of America®, Wells Fargo®, Chase®, and any other institution(s) that provide credit or other financial backing for a payment vehicle. These financial institutions provide an array of financial services serviced through and by a network of financial institution intermediaries, depicted for simplicity as the financial institution intermediary server(s) 804.

Returning generally to FIG. 8, the transaction server 812 includes a transaction engine 814 and an incentives and promotion engine 816. The transaction engine 814 is a programming engine implemented on the CRM and POS system 800 that executes and processes real-time transactions and batched transactions, for example, for the broader POS applications and services (not shown). Real-time transactions are transactions that have been received from the vendor application executing on the dedicated mobile computing device 830, for example, wherein the transaction server 812 successfully executing the transaction engine 814 communicates through a network with typical reliability 808, for example, to the financial institution intermediary server 804. The financial institution intermediary server 804 then communicates to the issuing financial institution 854 for the holder of the payment vehicle. As illustrated in FIG. 8, the payment vehicle is an RFID band 822 but the term payment vehicle includes credit cards, check cards, e-Cards, chip credit cards, NFC devices, and other payment vehicles in the art. The transaction engine 814 also records transaction errors that relate to the processing of the transactions 838.

The incentives and promotion engine 816 is a programming engine implemented on the CRM and POS system 800 that executes and processes data gathering, data mining, and data analysis to implement a patron experience program, for example, for the broader CRM applications and services (not shown). As illustrated in FIG. 8, the event 846 includes the patron with RFID band 822 going amongst various event 846 vendors 824,828,836,838 and authorizing/executing various transactions 838 via the RFID band on the dedicated POS computing device 830 and/or other peripheral computing devices 832. The incentives and promotion engine 816 stores, analyzes, and gains access to (directly or indirectly) patron data, such as contact information, purchase history, credit card and payment information (or customer token IDs 819 from a credit vault financial institution intermediary server 804, for example), third-party accounts and registrations, system credits and debits and incentives/promotions (available or active), and live feedback and preloaded preferences, and detailed customer profiles 820 based on customer preferences/profiles, past transaction and future predictions, and past and current customer behavior at the event 846. The incentives and promotion engine 816 also works in tandem with the transactions engine 814 or any other engine of the system 800. For example, the incentives and promotion engine 816 can provide real-time or batched data on patron engagement and activity to the transactions engine 814, which allows the transactions engine 814 to make real-time or batched adjustments to the offerings, incentives, and promotions made available to the patron with the RFID band 822 and shown via a GUI (best seen in FIGS. 9A-9C) on a display 104 (best seen in FIG. 1) of the dedicated POS computing device 830 to enhance the overall patron experience.

Figure 9A:
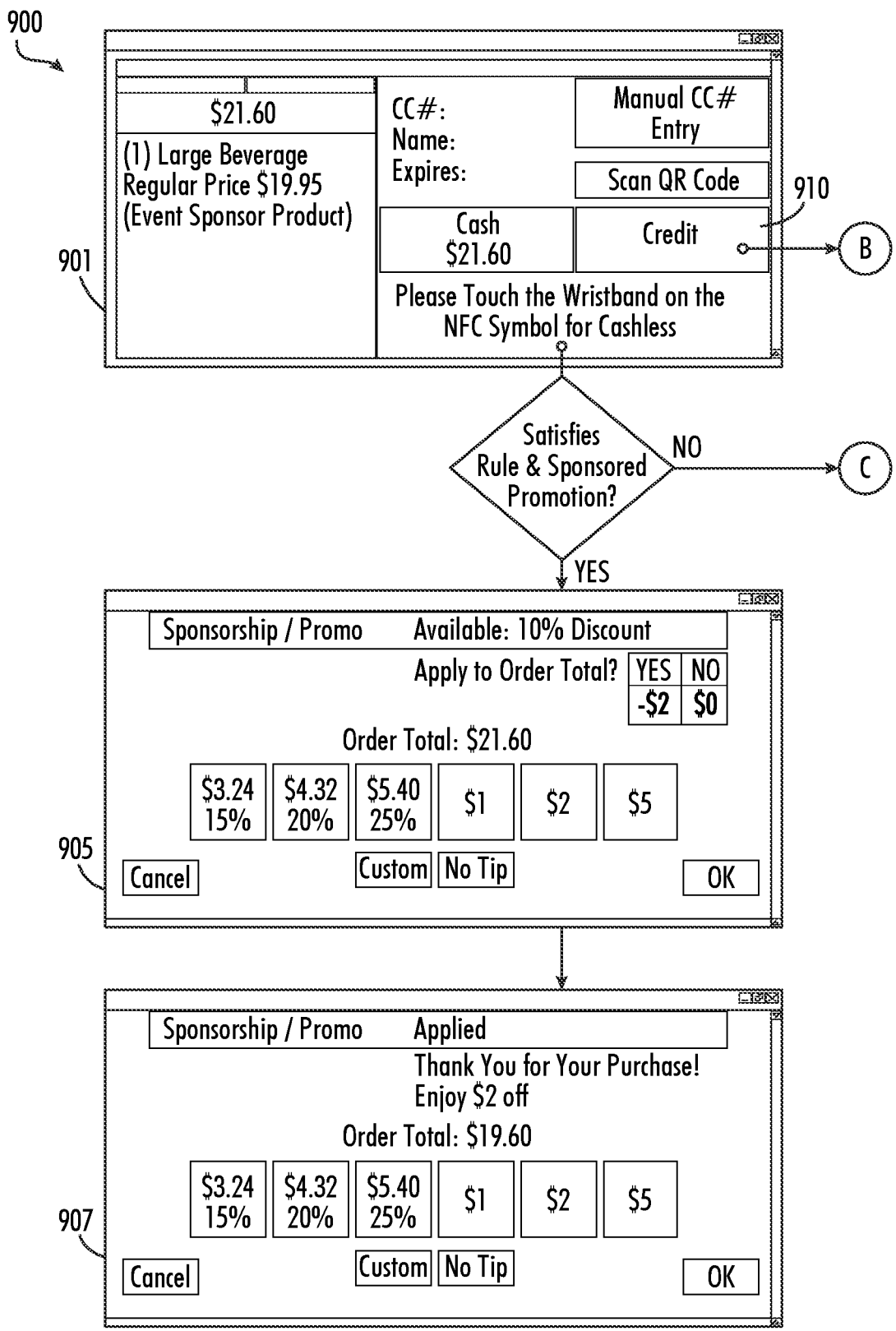
FIG. 9A shows a perspective view of an illustration of an example graphical user interface (GUI) implementing a sponsored promotion on a CRM and POS system according to the present disclosure.
Figure 9B:
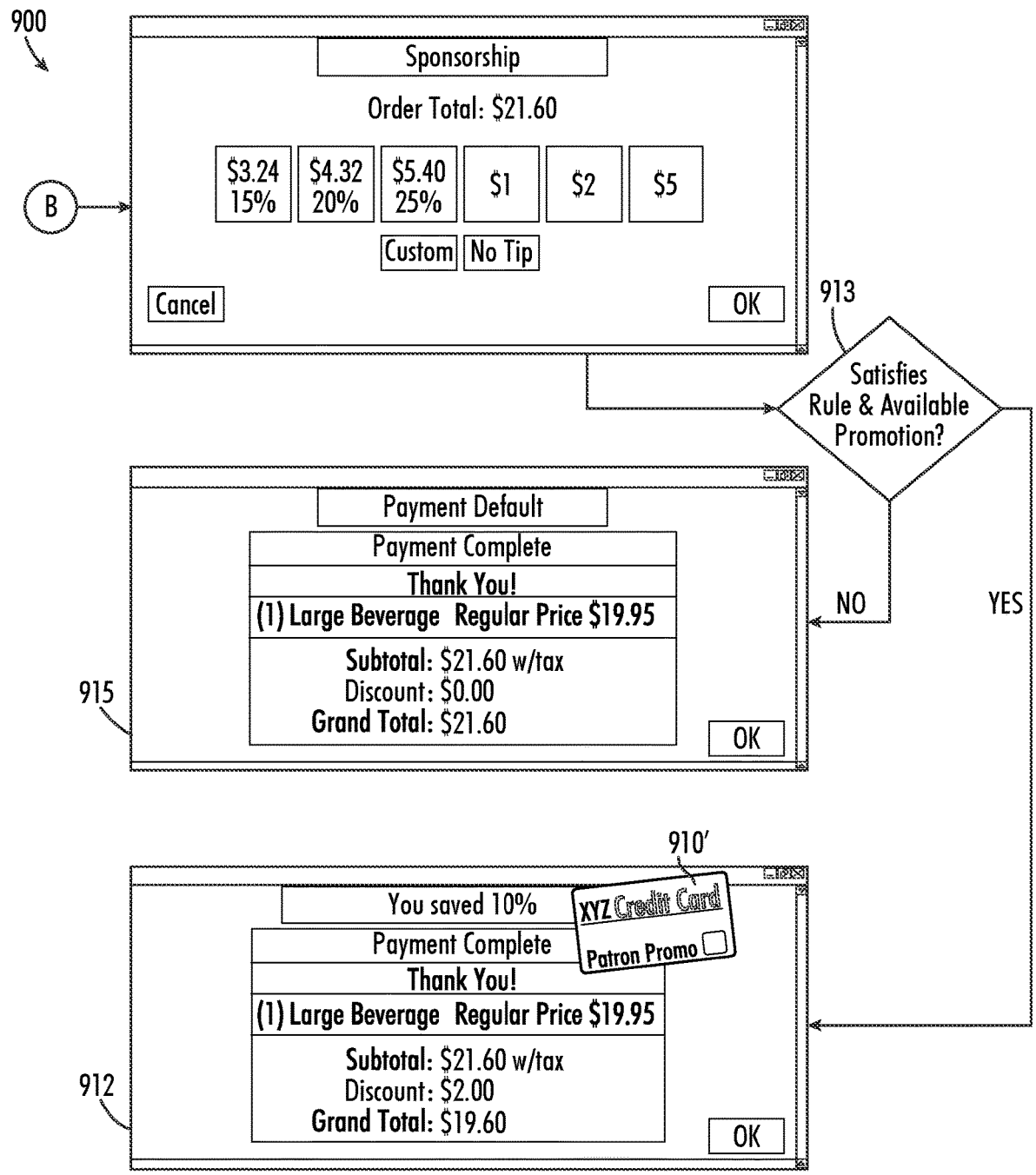
FIG. 9B shows a perspective view of an illustration of an example GUI implementing an available promotion according to the present disclosure.
Figure 9C:
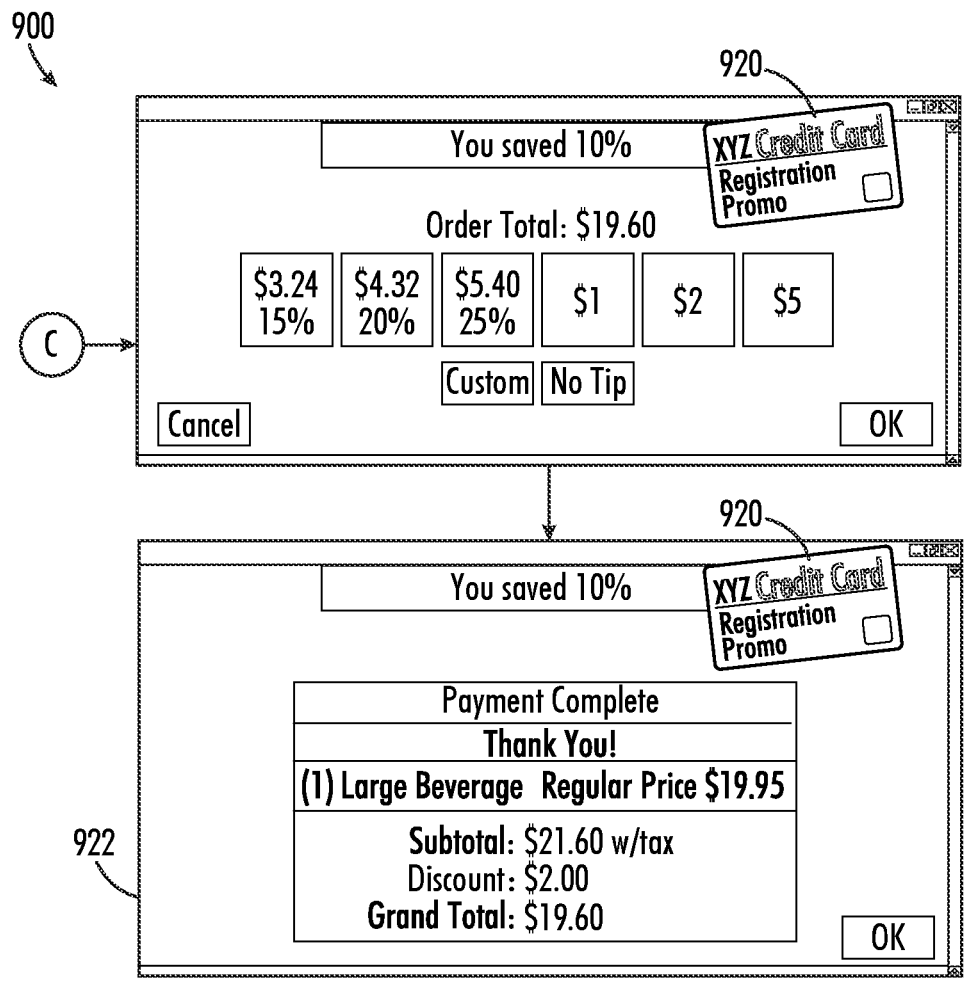
FIG. 9C shows a perspective view of illustration of an example GUI implementing an activated or registered promotion according to the present disclosure.

Referring now to FIGS. 9, perspective views of an illustration of an example GUI shown on a display of a dedicated POS computing device of a CRM and POS system at an event or function according to the present disclosure is shown. In particular, FIG. 9A is a perspective view of an illustration of an example GUI implementing a sponsored promotion on a CRM and POS system according to the present disclosure. FIG. 9B is a perspective view of an illustration of an example GUI implementing an available promotion according to the present disclosure. FIG. 9C is a perspective view of illustration of an example GUI implementing an activated or registered promotion according to the present disclosure.

More specifically, as illustrated in FIGS. 8 and 9A, the GUI 900 running on the dedicated POS computing device(s) 830 is enabled, for example, by at least the transaction engine 814 and the incentives and promotion engine 816 of the CRM and POS system 800 at the event 846. The event 846 has a patron wearing an RFID band 822 making a transaction at any of the vendors 836 (e.g., buying an event 846 sponsor's adult beverage, for which there is a sponsored-promotion available, at the regular price of $19.95), via the dedicated POS computing device 830 (best seen in FIG. 1), and paying using the RFID band 822 that the patron registered for before or upon arriving at the event 846. The sponsored promotion of FIG. 9A is configured to incentivize registration (e.g., ultimately, with a patron experience system of the CRM and POS system 800, for example) and use of the RFID band 822 (or any other similar technology) to effect an efficient, effective, and customized patron experience at the event 846 as described herein. The sponsored promotion of FIG. 9A also is configured to incentivize registration of certain types/brands of payment vehicles or payment methods, financial accounts or banking accounts, or third-party relationships, as described herein.

Returning generally to FIGS. 8 and 9A, the transaction engine 814 and the incentives and promotion engine 816 of the CRM and POS system 800 perform network communications and processing as described for FIGS. 1-6, and/or search, retrieve, and execute from memory 710 as described for FIG. 7. In particular, the transaction engine 814 and the incentives and promotion engine 816 work in tandem to recognize the transaction of FIG. 9A, to process the transaction as one satisfying a rule at 903: is the transaction involving a registered RFID band 822 and does it qualify for the sponsored promotion, and, if so, to adjust the GUI 900 to reflect the sponsored promotional offer (e.g., to display availability of the 10% discount sponsored promotion at 901, to display an option for the patron to accept and apply or reject the sponsored promotion at 905, and to display an updated order total of $19.60 including tax after the $2 sponsored promotion discount at 907.

In another embodiment, the patron with RFID band 822 does not have to accept and apply or reject the sponsored promotion at 905; instead, the patron with RFID band 822 is made aware of the sponsored promotion and makes a decision upon registering for the RFID band 822. In another embodiment, the patron with RFID band 822 does not have to accept and apply or reject the sponsored promotion at 905; instead, activities/transactions/actions taken by the patron and tracked by the RFID band 822 trigger automatic activation of the sponsored promotion and the patron is made aware upon registering for the RFID band 822 and/or at checkout time on the dedicated POS computing device(s) 830. In another embodiment, a registered RFID band 822 is not necessary as the patron technically can register their payment information or credit card, for example, directly with the CRM and POS system 800 and then use the credit card instead of the RFID band 822 and experience the same functionality described above for FIG. 9A.

Referring now to the example of FIGS. 8, 9A, and 9B, a GUI 900 is running on a dedicated POS computing device(s) 830 and enabled by a transaction engine 814 and an incentives and promotion engine 816 of a CRM and POS system 800 at an event 846. The event 846 has a patron using their credit card 910 to pay for a transaction(s) at any of the vendors 836 (e.g., buying an event 846 adult beverage at the regular price of $19.95, but for which a promotion is available), via the dedicated POS computing device 830 (best seen in FIG. 1). The available promotion of FIG. 9B is configured to incentivize or promote target behavior(s) by the patron at the event 846 (e.g., to promote diverse consumer transactions by the patron at target vendor(s), and/or to promote repeat or bulk consumer transactions by the patron at the same vendor or for the same product or service). The available promotion of FIG. 9B also is configured to incentivize use of certain types/brands of payment vehicles or payment methods, financial accounts or banking accounts, or third-party relationships, as described herein.

Returning generally to FIGS. 8, 9A, and 9B, the transaction engine 814 and the incentives and promotion engine 816 of the CRM and POS system 800 perform network communications and processing as described for FIGS. 1-6, and/or search, retrieve, and execute from memory 710 as described for FIG. 7. In particular, the transaction engine 814 and the incentives and promotion engine 816 work in tandem to recognize the transaction of FIG. 9B, to process the transaction as one satisfying a rule at 913: is the transaction involving credit card 910 and does it qualify for the available promotion by being XYZ credit card 910, and, if so, to adjust the GUI 900 to reflect the available promotional offer (e.g., to display application of the 10% discount promotion and to display an updated order total of $19.60 including tax after the $2 discount promotion at 912). If the available promotion does not apply (e.g., the credit card 910 did not trigger availability of the promotion, then the CRM and POS system 800 adjust the GUI 900 to reflect default transaction totals and default payment options at 915.

Referring now to the example of FIGS. 8, 9A, and 9C, a GUI 900 is running on a dedicated POS computing device(s) 830 and enabled by a transaction engine 814 and an incentives and promotion engine 816 of a CRM and POS system 800 at an event 846. The event 846 has a patron using their RFID band 822 (or any other similar technology) to pay for a transaction(s) at any of the vendors 836 (e.g., buying an event 846 adult beverage at the regular price of $19.95, but for which an activated or registered promotion is available), via the dedicated POS computing device 830 (best seen in FIG. 1). The activated or registered promotion of FIG. 9C is configured to incentivize pre-registration by the patron of their memberships, affiliations, participations, or third-party commercial patronages (credit card member, rewards members, wholesale club member, etc.) on the CRM and POS system 800 to effect an efficient, effective, and customized patron experience at the event 846 as described herein. The activated or registered promotion of FIG. 9C also is configured to incentivize use of certain types/brands of payment vehicles or payment methods, financial accounts or banking accounts, or third-party relationships, or to reward members, affiliates, participants, etc. of target event 846 partners or advertisers as described herein.

Returning generally to FIGS. 8, 9A, and 9C, the transaction engine 814 and the incentives and promotion engine 816 of the CRM and POS system 800 perform network communications and processing as described for FIGS. 1-6, and/or search, retrieve, and execute from memory 710 as described for FIG. 7. In particular, the transaction engine 814 and the incentives and promotion engine 816 work in tandem: to recognize the transaction of FIG. 9C; to process the transaction as one where RFID band 822 payment is intended with the preregistered XYZ credit card 920 information from event 846 sponsor XYZ Bank; and to adjust the GUI 900 to reflect the available promotional offer (e.g., to display application of the 10% activated discount and to display an updated order total of $19.60 including tax after the $2 activated discount at 922). If the available promotion does not apply (e.g., the credit card 910 did not trigger availability of the promotion, then the CRM and POS system 800 adjust the GUI 900 to reflect default transaction totals and default payment options at 915.

Figure 10:
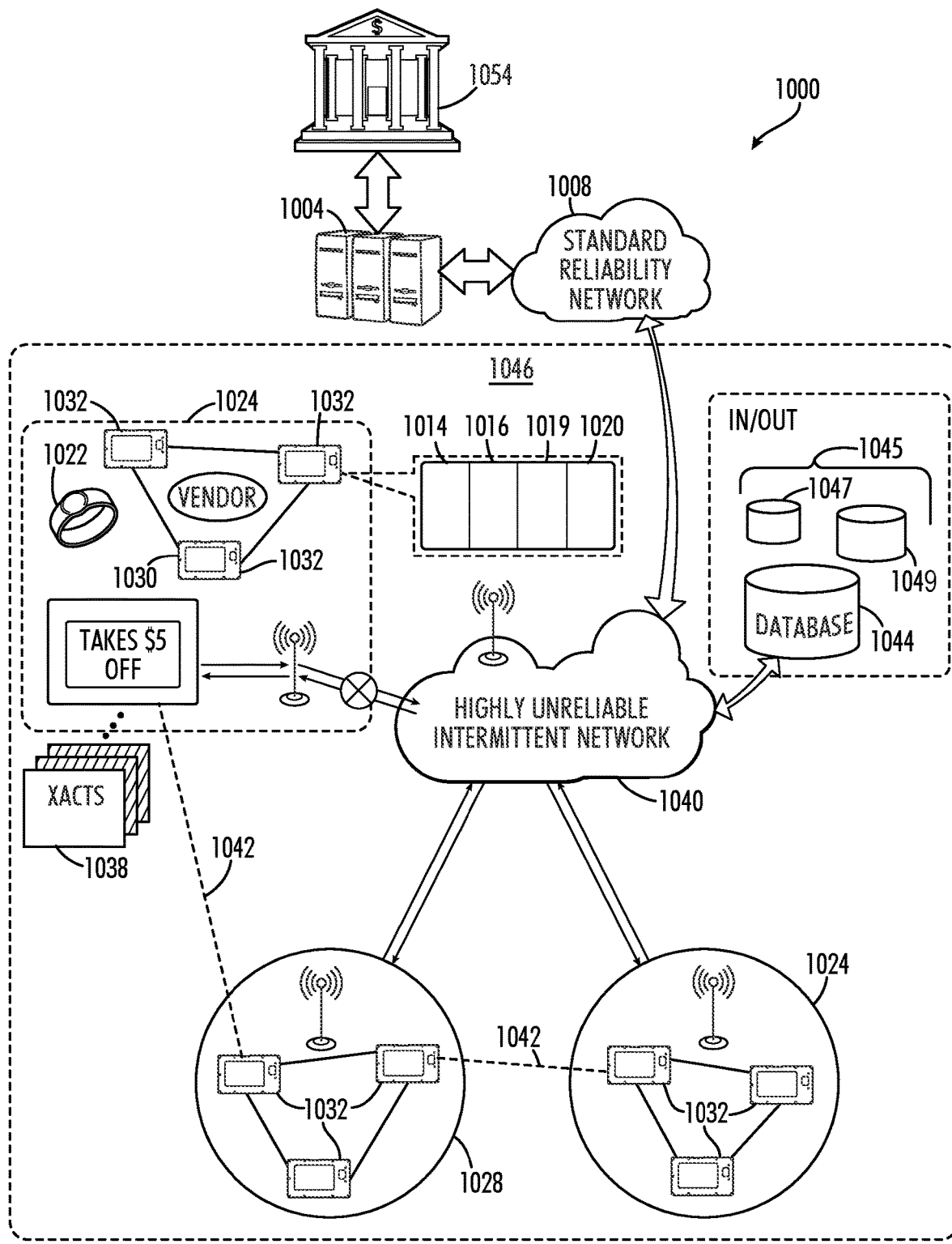
FIG. 10 shows a plan view of a schematic illustration of an example CRM and POS system at an event or function implementing an available promotion according to the present disclosure.

Referring now to FIG. 10, a plan view of a schematic illustration of an example CRM and POS system at an event or function implementing an available promotion according to the present disclosure is shown. A portion of the CRM and POS system 1000 is framed in an event (or function) 1046 such as a music festival or convention having a highly unreliable intermittent network 1040 and, therefore, the portion of the CRM and POS system 1000 exists in the network topology as described for FIGS. 1-6 (e.g., the dedicated POS computing device 1030 and the other peripheral computing devices 1032 are interconnected via a peer-to-peer or node-to-node network 1042 as described herein). The event 1046 also has a patron wearing an RFID band 1022 making a transaction 1038 at vendor 1034 (e.g., buying an event 1046 adult beverage, for which a promotion is available), via a dedicated POS computing device 1030, and paying using the RFID band 1022 that the patron registered for before or upon arriving at the event 1046. The patron previously visited vendor 1024 and vendor 1028 for a similar transaction (e.g., buying an event 1046 adult beverage, but for which a promotion was not yet available). The available promotion of FIG. 10 is configured to incentivize or promote a target behavior(s) by the patron at the event 1046 (e.g., to promote the patron buying at least three (3) adult beverages by offering a discount on the purchase of the third adult beverage).

Returning generally to FIG. 10, the distributed CRM and POS system 1000 is configured to perform network communications and processing as described for FIGS. 1-6, and/or write, read, search, retrieve, and execute from a database 1044 (e.g., a database 1044 on memory 710 as described for FIG. 7, for example). In particular, a transaction engine 1014 and an incentives and promotion engine 1016 of the CRM and POS system 1000 are configured to recognize the current transaction 1038 of FIG. 10, to process the transaction 1038 as one involving a registered RFID band 1022 and that qualifies for the available promotion (e.g. fetching/pushing system data on a distributed ledger or linked list via the peer-to-peer or node-to-node network 1042, for example, indicating the registered RFID band 1022 facilitated two prior eligible transactions 1038 at the vendor 1024 and at the vendor 1028 and is facilitating the current qualifying transaction 1038 at the vendor 1034). If so, the transaction engine 1014 and the incentives and promotion engine 1016 also are configured to adjust the display of the dedicated POS computing device 1030 to show the $2 available promotion discount.

More specifically, the transaction engine 1014 and the incentives and promotion engine 1016 are configured to store, analyze, and gain access to (directly or indirectly) data on and/or from the database 1044 associated with RFID band 1022, such as contact information, purchase history, customer token IDs 1019 from a credit vault financial institution intermediary server 1004, third-party accounts and registrations, system credits and debits and incentives/promotions (activated and/or registered for), live feedback and preloaded preferences, and a detailed patron profile 1020 based on customer preferences/profiles, past transaction and future predictions, and past and current customer behavior at the event 1046. The database 1044 includes one or more data repositories or warehouses, such as a data lake 1045 to receive and store the CRM and POS system 800 data and the network data. The data lake 1045, comprised of raw data 1047 and processed data 1049, enables the storage of structured and/or unstructured raw data 1047 and/or processed data 1049 at any scale and can be leveraged for analytics or further for machine learning, artificial intelligence, neural networks, etc. Data is pushed, pulled, or otherwise transmitted to the data lake 1045 in a batch process or in a continuous stream (i.e. continuous data stream). The data lake 1045 is configured to store and/process data across multiple buckets. For example, the data lake 1045 stores the data in raw form in a first bucket and subsequently the data lake processes the data in raw form and stores the processed data in a second bucket.

In particular, the distributed CRM and POS system 1000 is configured to generate data collectively referred to as accumulated data or source data. Accumulated data, in some instances, may be stored in a local temporary storage or cache (best seen in FIG. 7), or in one or more local connected database(s), not shown, such as a relational database. An accumulated data set can subsequently or immediately be placed into a data stream for transmission to the data lake 1045. The accumulated data set can be transmitted or otherwise communicated to the data lake 1045 in one or more batch processes (e.g. from local data storage) or in a streaming process. A data extract, transform, and load (ETL) service or process delivers batch and/or streaming data to the data lake 1045, and, in some instances, the ETL process collects the accumulated data set into one or more files on an object storage infrastructure, such as a raw data bucket 1047. Data stored in the raw data bucket is processed or otherwise transformed and subsequently stored in a processed data bucket 1047. The distributed CRM and POS system 1000 also is configured to query, mine, or otherwise interact with the data lake 1045. The database 1044 and/or the data lake 1045 may be inside or outside of the event 1046 network environment and topology.

The financial institution intermediary server 1004, as illustrated in FIG. 10, is a credit vault institution server between the CRM and POS system 1000 and the ultimate issuing financial institution(s) 1054 for the transactions 1038. Issuing financial institutions (1054) are financial institutions that give credit through various payment vehicles as disclosed herein or as disclosed in any of the applications incorporated by reference.

IV. EMBODIMENTS

Certain implementations of systems and methods consistent with the present disclosure are provided as follows:

Clause 1. A method for implementing a customer relationship management (CRM) and point of sale (POS) system on a node-to-node network for patron experience, the method comprising: (i) capturing transaction data or generating transaction data from one or more POS devices of a plurality of POS devices establishing a node-to-node network for processing payment on a commercial transaction; (ii) aggregating a data set associated with the commercial transaction; and (iii) reconciling the aggregated data set with a distributed ledger operating on the node-to-node network.

Clause 2. The method of clause 1, further comprising providing the plurality of POS devices.

Clause 3. The method of clause 1, further comprising providing one or more payment vehicle(s).

Clause 4. The method of clause 3, further comprising associating information for making payment on the commercial transaction with the one or more payment vehicle(s).

Clause 5. The method of clause 4, wherein associating the information further comprises associating customer token ID information with the one or more payment vehicle(s).

Clause 6. The method of clause 5, further comprising obtaining the customer token ID information from a credit vault intermediary institution.

Clause 7. The method of clause 5, further comprising invoking an incentive credit based on the customer token ID information.

Clause 8. The method of clause 1, further comprising loading the aggregated data set into a data lake.

Clause 9. The method of clause 1, further comprising synchronizing the plurality of POS devices with the aggregated data set.

Clause 10. The method of clause 1, further comprising invoking an incentive credit based on network device address information and network timestamp information.

Clause 11. The method of clause 1, further comprising invoking an incentive credit based on globally unique identifier (GUID) information.

Clause 12. A customer relationship management (CRM) and point of sale system for patron experience, comprising: a payment vehicle associated with information for making payment on a commercial transaction; and a plurality of point of sale (POS) devices establishing a node-to-node network for processing payment on the commercial transaction, wherein each POS device of the plurality of POS devices comprises a memory for storing program instructions and a processor configured to execute the program instructions, and wherein, upon executing the program instructions, the processor is configured to: (i) capture transaction data or generate transaction data from one or more POS devices of the plurality of POS devices; (ii) aggregate a data set associated with the commercial transaction; and (iii) reconcile the aggregated data set with a distributed ledger operating on the node-to-node network.

Clause 13. The system of clause 12, wherein the processor is further configured to determine customer token ID information associated with the payment vehicle.

Clause 14. The system of clause 13, wherein the processor is further configured to obtain the customer token ID information from a credit vault intermediary institution.

Clause 15. The system of clause 14, wherein the processor is further configured to invoke an incentive credit based on the customer token ID information.

Clause 16. The system of clause 12, wherein the processor is further configured to load the aggregated data set into a data lake.

Clause 17. The system of clause 12, wherein the processor is further configured to synchronize the plurality of POS devices with the aggregated data set.

Clause 18. The system of clause 12, further comprising invoking an incentive credit based on network device address information and network timestamp information.

Clause 19. The system of clause 12, further comprising invoking an incentive credit based on GUID information.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for implementing a plurality of point of sale (POS) devices having intermittent or unreliable network communications with a central network, for processing payment on a commercial transaction, comprising:
   (i) providing a payment vehicle configured as an RFID band or as an NFC wireless communication object;
   (ii) providing a first POS device of a plurality of POS devices, the first POS device configured to process payment on a commercial transaction through direct network communications with an access point to a central network, wherein, when experiencing network communication issues with the access point, further configured to process payment on the commercial transaction through a node-to-node network;
   (iii) capturing transaction data associated with the payment vehicle, at the first POS device, for processing payment on the commercial transaction;
   (iv) providing a second POS device of the plurality of POS devices, the second POS device in communication with at least one access point to the central network;
   (v) experiencing, at the first POS device, network communication issues with the access point;
   (vi) establishing, with the plurality of POS devices, the node-to-node network for processing payment on the commercial transaction, the node-to-node network configured to enable communications between the plurality of POS devices and the central network, and configured to obtain customer token ID information from a credit vault intermediary institution and to associate the customer token ID information with the payment vehicle;
   (vii) transmitting the transaction data captured at the first POS device, through the node-to-node network, to the second POS device;

(viii) reconciling the transaction data, on the second POS device, with a distributed ledger operating on the node-to-node network;
(ix) associating information for making payment on the commercial transaction with the transaction data;
(x) establishing, at the second POS device, a connection with the at least one access point to the central network;
(xi) transmitting, from the second POS device to the central network, through the at least one access point, the information for making payment on the commercial transaction;
(xii) invoking, at the first POS device, an incentive credit based on the customer token ID information; and
(xiii) loading the transaction data into a data lake.

2. The method of claim 1, further comprising synchronizing the plurality of POS devices with the transaction data.

3. The method of claim 1, wherein invoking the incentive credit is based on the customer token ID information and network timestamp information.

4. The method of claim 1, wherein invoking the incentive credit is based on globally unique identifier (GUID) information.

5. A plurality of point of sale (POS) devices having intermittent or unreliable network communications with a central network, for processing payment on a commercial transaction, comprising:
   a payment vehicle configured as an RFID band or as an NFC wireless communication object, and associated with information for making payment on a commercial transaction;
   a plurality of POS devices establishing a node-to-node network, for processing payment on the commercial transaction and configured to enable communications between the plurality of POS devices and a central network, and configured to obtain customer token ID information from a credit vault intermediary institution and to associate the customer token ID information with the payment vehicle; and
   a first POS device and a second POS device of the plurality of POS devices, the first POS device configured to process payment on the commercial transaction through direct network communications with an access point to a central network, and, when experiencing network communication issues with the access point, further configured to process payment on the commercial transaction through a node-to-node network, the first POS device further configured to capture transaction data associated with the payment vehicle and further configured to transmit the transaction data, through the node-to-node network, to the second POS device, the first POS device further configured to invoke an incentive credit based on the customer token ID information, the first POS device experiencing network communication issues with the access point, the second POS device configured to communicate with at least one access point to the central network, the second POS device further configured to reconcile the transaction data, on the second POS device, with a distributed ledger operating on the node-to-node network, the second POS device further configured to transmit, from the second POS device to the central network, through the at least one access point, the information for making payment on the commercial transaction, and the second POS device further configured to load the transaction data into a data lake.

6. The plurality of POS devices of claim 1, wherein the second POS device is further configured to synchronize the plurality of POS devices with the transaction data.

7. The plurality of POS devices of claim 5, wherein the first POS device is configured to invoke the incentive credit based on the customer token ID information and network timestamp information.

8. The plurality of POS devices of claim 5, wherein the first POS device is configured to invoke the incentive credit based on GUID information.

* * * * *